(12) United States Patent
Zhou et al.

(10) Patent No.: US 12,202,992 B2
(45) Date of Patent: Jan. 21, 2025

(54) WHITE INK COMPOSITIONS

(71) Applicant: Hewlett-Packard Development Company, L.P., Spring, TX (US)

(72) Inventors: Zhang-Lin Zhou, San Diego, CA (US); Jie Zheng, San Diego, CA (US); Dennis Z. Guo, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 535 days.

(21) Appl. No.: 17/435,713

(22) PCT Filed: Oct. 3, 2019

(86) PCT No.: PCT/US2019/054421
§ 371 (c)(1),
(2) Date: Sep. 2, 2021

(87) PCT Pub. No.: WO2021/066828
PCT Pub. Date: Apr. 8, 2021

(65) Prior Publication Data
US 2022/0243079 A1 Aug. 4, 2022

(51) Int. Cl.
*C09D 11/00* (2014.01)
*C09D 11/033* (2014.01)
(Continued)

(52) U.S. Cl.
CPC .......... *C09D 11/322* (2013.01); *C09D 11/033* (2013.01); *C09D 11/037* (2013.01);
(Continued)

(58) Field of Classification Search
CPC ... C09D 11/322; C09D 11/033; C09D 11/037; C09D 11/102
(Continued)

(56) References Cited

U.S. PATENT DOCUMENTS

| 7,368,487 B2 | 5/2008 | Wu et al. |
| 9,133,357 B2 | 9/2015 | Sasada et al. |

(Continued)

FOREIGN PATENT DOCUMENTS

| CN | 104837637 A | 8/2015 |
| CN | 104961875 A | 10/2015 |

(Continued)

OTHER PUBLICATIONS

Dong Yongchun et al., Properties and Applications of Textile Finishing Agents, 1st edition, Mar. 1999, pp. 76-77, China Textile Press; includes EN translation.

(Continued)

*Primary Examiner* — James E McDonough
(74) *Attorney, Agent, or Firm* — HP Inc. Patent Department

(57) ABSTRACT

The present disclosure includes a white ink composition including a liquid vehicle with water and organic co-solvent, from 0.5 wt % to 15 wt % white metal oxide particles dispersed in the liquid vehicle, and from 0.1 wt % to 30 wt % of polyurethane particles dispersed in the liquid vehicle. The polyurethane particles include a polyurethane polymer with polymerized sulfonated-diamines, polymerized non-ionic diamines, and isocyanate-generated self-crosslinked amines.

15 Claims, 3 Drawing Sheets

(51) Int. Cl.
  *C09D 11/037* (2014.01)
  *C09D 11/102* (2014.01)
  *C09D 11/322* (2014.01)
  *D06P 1/52* (2006.01)
  *D06P 1/673* (2006.01)
  *D06P 5/20* (2006.01)
  *D06P 5/30* (2006.01)

(52) U.S. Cl.
  CPC .......... *C09D 11/102* (2013.01); *D06P 1/5285* (2013.01); *D06P 1/673* (2013.01); *D06P 5/2077* (2013.01); *D06P 5/30* (2013.01)

(58) Field of Classification Search
  USPC .................. 106/31.01, 31.13, 31.6, 157.8
  See application file for complete search history.

(56) References Cited

U.S. PATENT DOCUMENTS

| | | |
|---|---|---|
| 9,243,155 B2 | 1/2016 | Okamura et al. |
| 9,284,464 B2 | 3/2016 | Nagashima et al. |
| 9,963,592 B2 | 5/2018 | Burns et al. |
| 10,066,112 B2 | 9/2018 | Nakamura et al. |
| 2005/0182154 A1 | 8/2005 | Berge et al. |
| 2006/0211838 A1 | 9/2006 | Eugene et al. |
| 2007/0060670 A1 * | 3/2007 | Ellis .......................... D06P 5/30 523/160 |
| 2015/0299948 A1 | 10/2015 | Pan et al. |
| 2018/0002555 A1 | 1/2018 | Kasperchik et al. |

FOREIGN PATENT DOCUMENTS

| | | | |
|---|---|---|---|
| CN | 106800632 A | 6/2017 | |
| EP | 1924658 A1 * | 5/2008 | ............ C09D 11/322 |
| RU | 2646428 C2 * | 3/2018 | ............ C08F 220/06 |
| WO | 2014039306 | 3/2014 | |
| WO | WO-2014039306 A1 * | 3/2014 | .......... B41M 5/0017 |
| WO | 2016175738 | 11/2016 | |

OTHER PUBLICATIONS

Dong Yongchun, Textile Auxiliary Chemistry, 1st edition, p. 67, Donghua University Press, Jan. 2010, Includes EN translation.

Lin Kongyong et al., Rubber Industry Handbook, vol. 6, Industrial Rubber Products, 1st edition, Jun. 1995, p. 1077, Chemical Industry Press; including EN translation.

* cited by examiner

WHITE INK COMPOSITIONS

BACKGROUND

Inkjet printing has become a popular way of recording images on various media. Some of the reasons include low printer noise, variable content recording, capability of high-speed recording, and multi-color recording. These advantages can be obtained at a relatively low price to consumers. As the popularity of inkjet printing increases, the types of use also increase providing demand for new ink compositions. In one example, textile printing can have various applications including the creation of signs, banners, artwork, apparel, wall coverings, window coverings, upholstery, pillows, blankets, flags, tote bags, clothing, etc.

DETAILED DESCRIPTION

Figure 1:
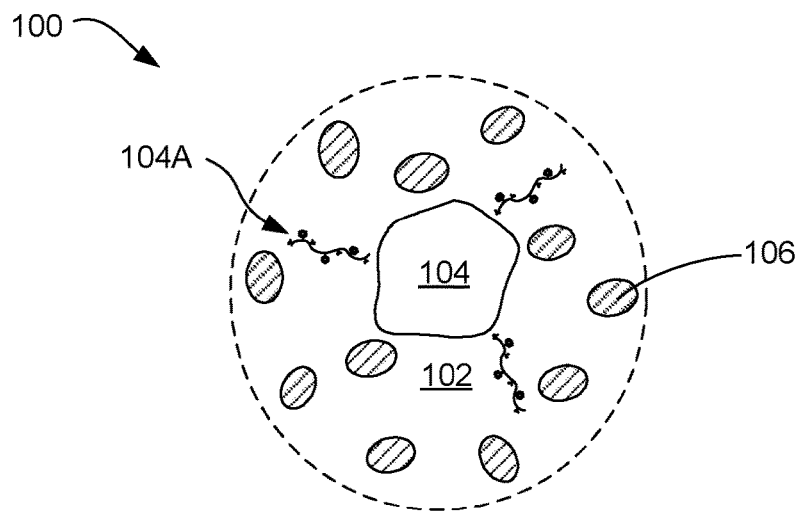
FIG. 1 schematically depicts an example white ink composition in accordance with the present disclosure.

The present technology relates to white ink compositions that can be used, for example, for printing on fabrics, including dark fabrics. For the white ink compositions in particular, there can be a challenge in providing polymer binders that contribute or allow for good opacity provided by the white metal oxide particles (or white pigment), particularly since white metal oxide particles often have a relative high density, e.g., 4.23 g/cm$^3$ for rutile titanium dioxide and 3.78 g/cm$^3$ for anatase titanium dioxide, and particle packing can lead to reduced opacity in some instances. Additionally, finding a combination of white metal oxide particles and polymer binder that together provide good jetability as well as good durability performance during wash cycling can present issues in some instances.

In accordance with this, in one example, a white ink composition includes a liquid vehicle including water and organic co-solvent, from 0.5 wt % to 15 wt % of white metal oxide particles dispersed in the liquid vehicle, and from 0.1 wt % to 30 wt % of polyurethane particles dispersed in the liquid vehicle. The polyurethane particles include a polyurethane polymer with polymerized sulfonated-diamines, polymerized nonionic diamines, and isocyanate-generated self-crosslinked amines. In one example, the polyurethane particles can also include from 15 wt % to 25 wt % polymerized diisocyanates, including polymerized isophorone diisocyanate, polymerized 2,2,4-trimethylhexane-1,6-diisocyanate, polymerized 2,4,4-trimethylhexane-1,6-diisocyanate, or a mixture thereof. In another example, the polymerized sulfonated-diamines can include multiple amine groups polymerized along a backbone of the polyurethane polymer and a sulfonate group appended to the backbone as part of a side chain therefrom. The polymerized nonionic diamines can include a saturated C2 to C16 alkyl diamine, a C6 to C18 saturated alicyclic diamine, or a C8 to C20 alicyclic-alkyl diamine. The isocyanate-generated self-crosslinked amines can be present on the polyurethane particles at from 1 wt % to 10 wt %. In further detail, the polyurethane particles can have a D50 particle size from 20 nm to 400 nm. The polyurethane particles can have an acid number from 0 mg KOH/g to 30 mg KOH/g. In one example, the polyurethane particles can have a D50 particle size from 125 nm to 250 nm and an acid number from 1 mg KOH/g to 15 mg KOH/g. In yet another example, the polyurethane particles include can include polyester polyurethane moieties.

In another example, a textile printing system includes a fabric substrate and a white ink composition. The white ink composition includes a liquid vehicle with water and organic co-solvent, from 0.5 wt % to 15 wt % of white metal oxide particles dispersed in the liquid vehicle, and from 0.1 wt % to 30 wt % of polyurethane particles dispersed in the liquid vehicle. The polyurethane particles include a polyurethane polymer with polymerized sulfonated-diamines, polymerized nonionic diamines, and isocyanate-generated self-crosslinked amines. In one example, the system can include a heat curing device to heat the fabric substrate after the white ink composition is printed thereon to a temperature from 70° C. to 250° C. for a period of 15 seconds to 10 minutes. In one example, the fabric substrate can be a dark fabric substrate having an L* value from 15 to 50.

In another example, a method of textile printing includes jetting a white ink composition onto a fabric substrate, wherein the white ink composition includes a liquid vehicle having water and organic co-solvent, from 0.5 wt % to 15 wt % of white metal oxide particles dispersed in the liquid vehicle, and from 0.1 wt % to 30 wt % of polyurethane particles dispersed in the liquid vehicle. The polyurethane particles include a polyurethane polymer with polymerized sulfonated-diamines, polymerized nonionic diamines, and isocyanate-generated self-crosslinked amines. The method further includes heating the fabric substrate having the white ink composition printed thereon to a temperature from 70° C. to 250° C. for a period of 15 seconds to 10 minutes to self-crosslink the polyurethane particles. In one example, the polymerized sulfonated-diamines can include multiple amine groups polymerized along a backbone of the polyurethane polymer and a sulfonate group appended to the backbone as part of a side chain therefrom. Alternatively, or additionally, the polymerized nonionic diamines can include a saturated C2 to C16 alkyl diamine, a C6 to C18 saturated alicyclic diamine, or a C8 to C20 alicyclic-alkyl diamine. The polyurethane particles can have a D50 particle size from 20 nm to 400 nm, an acid number from 0 mg KOH/g to 30 mg KOH/g, or both in this example.

It is noted that when discussing the white ink composition, the textile printing systems, or the methods of textile printing herein, these discussions can be considered applicable to one another whether or not they are explicitly discussed in the context of that example. Thus, for example, when discussing an organic co-solvent related to the white ink composition, such disclosure is also relevant to and directly supported in the context of the textile printing systems and methods, and vice versa. It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Referring now to FIG. 1, a white ink composition 100 can include a liquid vehicle 102, which includes water and organic co-solvent (and may include other ingredients, such as surfactant, biocide, humectant, anti-kogation agent, chelating agent, etc.). The white ink composition also includes white metal oxide particles 104 dispersed in the liquid vehicle typically with the assistance of a dispersant 104A, e.g., polymer, oligomer, surfactant, small molecule, etc., that is associated with a surface of the white metal oxide particles by attachment, adsorption, electrostatic or ionic attraction, or some other chemical mechanism that associates the dispersant with the white metal oxide particles to assist in keeping the particles dispersed in the liquid vehicle. The white ink composition in this example also includes polyurethane particles 106. The polyurethane particles can include polymerized sulfonated-diamines, nonionic diamines, and isocyanate-generated self-crosslinked amines, for example.

The polymerized sulfonated-diamines of the polyurethane particles can be provided by sulfonated-aliphatic diamines, sulfonated-aromatic diamines, or a combination thereof, e.g., sulfonated-diamines with both aliphatic and aromatic moieties. The term "aliphatic" as used herein includes C2 to C20 aliphatic groups that can typically be saturated, such as alkyl groups, alicyclic groups, combinations of alkyl and alicyclic groups, etc., and can include straight-chain alkyl, branched alkyl, alicyclic, branched alkyl alicyclic, straight-chain alkyl alicyclic, alicyclic with multiple alkyl side chains, etc. That stated, in one example, the polymerized sulfonated-diamines can include a sulfonated aliphatic diamine having a saturated C2 to C16, C2 to C8, or a C3 to C6 alkyl moiety, a saturated C6 to C18, C6 to 14, or a C6 to C12 alicyclic moiety, or a combination thereof having a C6 to C20 alkyl-alicyclic moiety.

The polymerized nonionic diamines of the polyurethane particles can be provided from aliphatic diamines, for example, but these nonionic diamines do not include a sulfonate group or other charged group. These nonionic diamines can also be reacted with a polymer precursor to introduce polymerized nonionic diamines into the polyurethane polymer of the polyurethane particles. As mentioned in the context of the polymerized sulfonated-diamines, the term "aliphatic" refers to C2 to C20 aliphatic groups that can be typically saturated. Thus, the term "aliphatic" can be used similarly in the context of the nonionic diamines, and can include, for example, alkyl groups, alicyclic groups, combinations of alkyl and alicyclic groups, etc., and can include from C2 aliphatic to C20 aliphatic groups, e.g., straight-chain alkyl, branched alkyl, alicyclic, branched alkyl alicyclic, straight-chain alkyl alicyclic, alicyclic with multiple alkyl side chains, etc. For example, the nonionic diamines may include a saturated C2 to C16, C2 to C8, or a C3 to C6 alkyl moiety, a saturated C6 to C18, C6 to 14, or a C6 to C12 alicyclic moiety, or a combination thereof having a C6 to C20 alkyl-alicyclic moiety.

In further detail, the isocyanate-generated self-crosslinked amines of the polyurethane particles can be in the form of amino groups and/or secondary amines generated by molar excess of isocyanate groups relative to hydroxyl groups (from polymeric diols or other diols) not used in forming a precursor polymer, which is formed prior to forming the polyurethane particulates described herein in greater detail hereinafter. The term "isocyanate-generated self-crosslinked amines" refers to amino or secondary amines that can be generated from excess isocyanate (NCO) groups that are not utilized when forming the polymer precursor. Thus, upon reacting with water (rather than being used to form the polymer backbone with a diol) the excess isocyanate groups release carbon dioxide, leaving an amine or amino group where the isocyanate group was previously present. Thus, these amines are generated by the reaction of excess isocyanate groups with water to leave the isocyanate-generated amines, which typically will further react to form isocyanate-generated self-crosslinked amines. In one example, the isocyanate-generated self-crosslinked amines can be present as part of the polyurethane particles at from 1 wt % to 10 wt % or from 2 wt % to 8 wt % with respect to a total weight of the polyurethane particles.

In further detail, the polyurethane particles can include polyester polyurethane moieties in one more specific example. In still another example, the polyurethane particles can also further include a carboxylate group coupled directly to a polymer backbone of the polyurethane particles, which may be copolymerized into the polyurethane polymer as an organic acid diol, for example. Thus, in addition to a diol that may be used to react with the isocyanate groups to form the urethane linkages, a carboxylated diol may likewise be used to react with the diisocyanates to add carboxylated acid groups along a backbone of the polyurethane polymer of the polyurethane particles.

In some more specific examples, the polyurethane particles can have a D50 particle size from 20 nm to 400 nm, from 20 nm to 300 nm, from 30 nm to 250 nm, or from 40 nm to 200 nm. These polyurethane particles can include a polyurethane polymer having an acid number from 0 mg KOH/g to 30 mg KOH/g, from 0 mg KOH/g to 20 mg KOH/g, from 0 mg KOH/g to 19 mg KOH/g, from 0 mg KOH/g to 15 mg KOH/g, from 0 mg KOH/g to 10 mg KOH/g, from 1 mg KOH/g to 30 mg KOH/g, from 5 mg KOH/g to 30 mg KOH/g, or from 1 mg KOH/g to 19 mg KOH/g, for example.

When the white ink compositions of the present disclosure are printed on various types of fabrics, e.g., cotton, nylon, polyester, cotton/polyester blend, etc., they can exhibit good opacity, even on dark fabrics, such as fabrics having an L* value in CIELAB color space from 15 to 50, or from 20 to 45, for example, e.g., black, charcoal, or darker shades of blue, green, purple, etc. Furthermore, when white printed images from these ink compositions are exposed to durability challenges, such as washfastness, e.g., five (5) standard washing machine cycles using warm water and a standard clothing detergent (e.g., Tide@ available from Proctor and Gamble, Cincinnati, OH, USA), acceptable opacity can remain, due to a combination of the white metal oxide particles and the polyurethane particles in the white ink compositions of the present disclosure. Additionally, these polyurethanes can also exhibit good stability over time as well as good thermal inkjet printhead performance such as high drop weight, high drop velocity, and acceptable "Turn On Energy" or TOE curve values, with some inks exhibiting good kogation.

As mentioned, the polyurethane particles can include multiple amines from various sources so that the polyurethane polymer of the polyurethane particles include polymerized sulfonated-diamines, polymerized nonionic diamines, and isocyanate-generated self-crosslinked amines. To illustrate the preparation of these polyurethane particles, it is noted that sulfonated-diamines can be reacted with a polymer precursor resulting in some examples including a sulfonate pendant side chain with one of the amines attaching the pendant side chain to a polymer backbone and to other amine groups. The nonionic diamine can be polymerized into the polymer precursor similarly. The isocyanate-generated amino group, on the other hand, can be generated from excess isocyanate (NCO) groups that are not utilized when forming the polymer precursor, as also mentioned.

Turning to further detail regarding other components of the white ink compositions 110 that can be used for the systems and methods described herein, the white metal oxide particles can be any of a number of metal oxide particles, such as titanium dioxide, e.g., rutile titanium dioxide or anatase titanium dioxide, zinc oxide, zirconium oxide, which in some examples can be coated with aluminum oxide or silicon dioxide, etc., for example. These particles can have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. A dispersion of metal oxide particles suitable for forming the white ink compositions of the present disclosure can be prepared via milling or dispersing metal oxide powder in water in the presence of suitable dispersants. For example, the metal oxide dispersion may be prepared by milling inorganic white metal oxide particles having large particle size (in the micron range) in the presence of polymeric or oligomeric dispersants until a target smaller particle size is reached. For example, the starting dispersion to be milled can be an aqueous dispersion with solid content up to 40% by weight of the white metal oxide particles. The milling equipment that can be used may be a bead mill, which is an example of a wet grinding machine capable of using very fine beads having diameters of less than 1.0 mm (and, generally, less than 0.3 mm) as the grinding medium, for example, such as UltraApex™ Bead Mills from Kotobuki Industries Co. Ltd. (Japan). The milling duration, rotor speed, and/or temperature may be adjusted to achieve the dispersion particle size targeted.

The white metal oxide particles in the white ink composition may have a particle size, after milling and formulated into the white ink composition, from 200 nm to 1 μm, from 250 nm to 0.7 μm, or from 300 nm to 500 nm, for example. The white metal oxide particles can be included in the white ink composition at from 3 wt % to 25 wt %, from 5 wt % to 20 wt %, from 5 wt % to 15 wt %, or 8 wt % to 20 wt %, for example.

Additionally, in some examples, there may be colorless (or pale) metal oxide particles or other colorless (or pale) polymer particles added to provide spacing between the white metal oxide particles, which may enhance the opacity provided by the white metal oxide particles. The term "colorless" refers to particles that exhibit no color or if there is color, it is very light such that it will not influence the whiteness provided by the white metal oxide in a negative manner (becomes less white), but rather can influence the whiteness in a positive manner (provides spacing to increase whiteness or white opacity). For example, because of the relative high refractive index of the white metal oxide particles and the relative low refractive index optical spacing provided by certain particles, the opacity of a white ink composition printed on a textile fabric may be boosted, e.g., 0.1% to 25% compared to an ink without such optical spacer particle additives. In one specific example, the polyurethane particles prepared and used herein have a lower refractive index than the white metal oxide particles, and thus, may contribute to the increased opacity provided by the white metal oxide particles. That stated, in addition to the polyurethane particles described herein, there may be other types added as well in addition to the polyurethane particles, e.g. amphoteric alumina particles, silica particles, latex particles, etc. This opacity increase is sometimes assisted by the use of these often colorless particles may be explained by a crowding effect of tightly-packed high refractive index (n) particles with little or no spacing, which can decrease light scattering and increase transparency of the white ink composition layer. By optically spacing the white metal oxide particles with the low refractive index materials (and heat fusing on the fabric substrate after printing), an increase in opacity can be realized. As a further point, fusion can add enhanced durability to the printed fabric substrate, such as washfastness durability. In some cases, the fusing of the polyurethane particles may help the polymer distribute more evenly between light scattering white metal oxide particles and, hence, contribute to enhanced opacity as well.

The dispersant used to disperse the white metal oxide particles can be any of a number of polyacrylic or polyurethane dispersants, for example. The dispersant may be adsorbed or ionically attracted to a surface of the white metal oxide particles or can be covalently attached to a surface of the white metal oxide particles as a self-dispersed white metal oxide particle. In one example, the dispersant can be an acrylic dispersant, such as a styrene (meth)acrylate dispersant, or other dispersant suitable for keeping the white metal oxide particles suspended in the liquid vehicle. In one example, the styrene (meth)acrylate dispersant can be used, as it can promote π-stacking between the aromatic ring of the dispersant and various types of white metal oxide particles. In one example, the styrene (meth)acrylate dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene (meth)acrylate dispersant can have an acid number from 100 to 350, from 120 to 350, from 150 to 300, from 180 to 250, or about 214, for example. Example commercially available styrene-acrylic dispersants can include Joncryl® 671, Joncryl® 71, Joncryl® 96, Joncryl® 680, Joncryl® 683, Joncryl® 678, Joncryl® 690, Joncryl®296, Joncryl® 671, Joncryl® 696 or Joncryl® ECO 675 (all available from BASF Corp., Germany).

Examples of other short-chain anionic dispersants with low weight average molecular weight (Mw) (meth)acrylic acids homopolymers include polyacrylic acid (PAA), polymethacrylic acid (PMAA), or their salts. More specific examples include, but are not limited to, Carbosperse K-7028 (PAA 10 with M-2, 300), Carbosperse® K-752 (PAA with M-2,000), Carbosperse® K-7058 (PAA with M-7, 300), Carbosperse® K-732 (PAA with M-6,000), Carbosperse® K-752 (Na salt of PMAA with M-5,000), all available from Lubrizol Corporation. Others include Dispex® AA 4935 available from BASF Dispersions Pigments Division, as well as Tamol® 945 available from Dow Chemical. Non-ionic dispersants such as commercial examples of the polyether alkoxysilane dispersant include, but are not limited to, SilquestOA-1230 manufactured by Momentive Performance Materials and Dynasylan® 4144 manufactured by Evonik/Degussa. Other examples include soluble low-to-midrange M (usually having a weight average molecular weight less than about 15,000 Mw) branched copolymers of comb-type structures with polyether pendant chains and acidic anchor groups attached to the backbone, such as Disperbyk® 190 and Disperbyk® 199 available from BYK Chemic, as well as Dispersogen® PCE available from Clariant.

The term "(meth)acrylate" or "(meth)acrylic" refers to monomers, copolymerized monomers, etc., that can either be acrylate or methacrylate (or a combination of both), or acrylic acid or methacrylic acid (or a combination of both), as the acid or salt/ester form can be a function of pH. Furthermore, even if the monomer used to form the polymer was in the form of a (meth)acrylic acid during preparation, pH modifications during preparation or subsequently when added to a white ink composition can impact the nature of the moiety as well (acid form vs. salt or ester form). Thus, a monomer or a moiety of a polymer described as (meth) acrylate or a (meth)acrylic acid is not to be read so rigidly as to not consider relative pH levels, ester chemistry, and other general organic chemistry concepts.

The white ink compositions of the present disclosure can be formulated to include a liquid vehicle, which can include the water content, e.g., from 60 wt % to 90 wt % or from 75 wt % to 85 wt %, as well as organic co-solvent, e.g., from 4 wt % to 30 wt %, from 6 wt % to 20 wt %, or from 8 wt % to 15 wt %. Other liquid vehicle components can also be included, such as surfactant, antibacterial agent, other colorant, etc. However, as part of the white ink composition used in the systems and methods described herein, the white metal oxide particles, dispersant, and the polyurethane particles can be included or carried by the liquid vehicle components. Suitable pH ranges for the white ink composition can be from pH 6 to pH 10, from pH 7 to pH 10, from pH 7.5 to pH 10, from pH 8 to pH 10, 6 to pH 9, from pH 7 to pH 9, from pH 7.5 to pH 9, etc.

In further detail regarding the liquid vehicle, in addition to water, the co-solvent(s) can be present and can include any co-solvent or combination of co-solvents that are compatible with the white metal oxide particles, dispersant, and polyurethane particles. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1,3-propane diol (EPHD), glycerol, dimethyl sulfoxide, sulfolane, glycol ethers, alkyldiols such as 1,2-hexanediol, and/or ethoxylated glycerols such as LEG-1, etc.

A further component of the white ink composition can be the inclusion of a humectant. There may be some overlap between organic co-solvents and humectants, but the humectants can be selected to provide good decap, for example. Examples include, but are not limited to, alcohols, for example, glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; N-methyl-2-pyrrolidone; N-methyl-2-oxazolidinone; and monoalcohols such as n-propanol and iso-propanol. The humectants can be selected from 2,2'-thiodiethanol, glycerol, 1,3-propanediol, 1,5-pentanediol, polyethylene glycol, ethylene glycol, diethylene glycol, propylene glycol, tetraethylene glycol, 2-pyrrolidone, n-propanol, or mixtures thereof. In another example, the humectant includes a mixture of alcohols. In a further example, the humectant includes a mixture of 2,2'-thiodiethanol and a glycol such as a polyalkylene glycol.

The liquid vehicle can also include a surfactant and/or emulsifier. In general, the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, the surfactant can include a nonionic surfactant, such as a Surfynol® surfactant, e.g., Surfynol® 440 (from Evonik, Germany), or a Tergitol™ surfactant, e.g., Tergitol™ TMN-6 (from Dow Chemical, USA). In another example, the surfactant can include an anionic surfactant, such as a phosphate ester of a C10 to C20 alcohol or a polyethylene glycol (3) oleyl mono/di phosphate, e.g., Crodafos® N3A (from Croda International PLC, United Kingdom). The surfactant or combinations of surfactants, if present, can be included in the white ink composition at from about 0.01 wt % to about 5 wt % and, in some examples, can be present at from about 0.05 wt % to about 3 wt % of the white ink compositions.

Consistent with the formulations of the present disclosure, various other additives may be included to provide desired properties of the white ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide®, e.g., Acticide® B20 (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents, such as EDTA (ethylene diamine tetra acetic acid) or trisodium salt of methylglycinediacetic acid, may be included to eliminate the deleterious effects of heavy metal impurities, and buffer solutions may be used to control the pH of the ink. Viscosity modifiers and buffers may also be present, as well as other additives used to modify properties of the ink.

Figure 2:
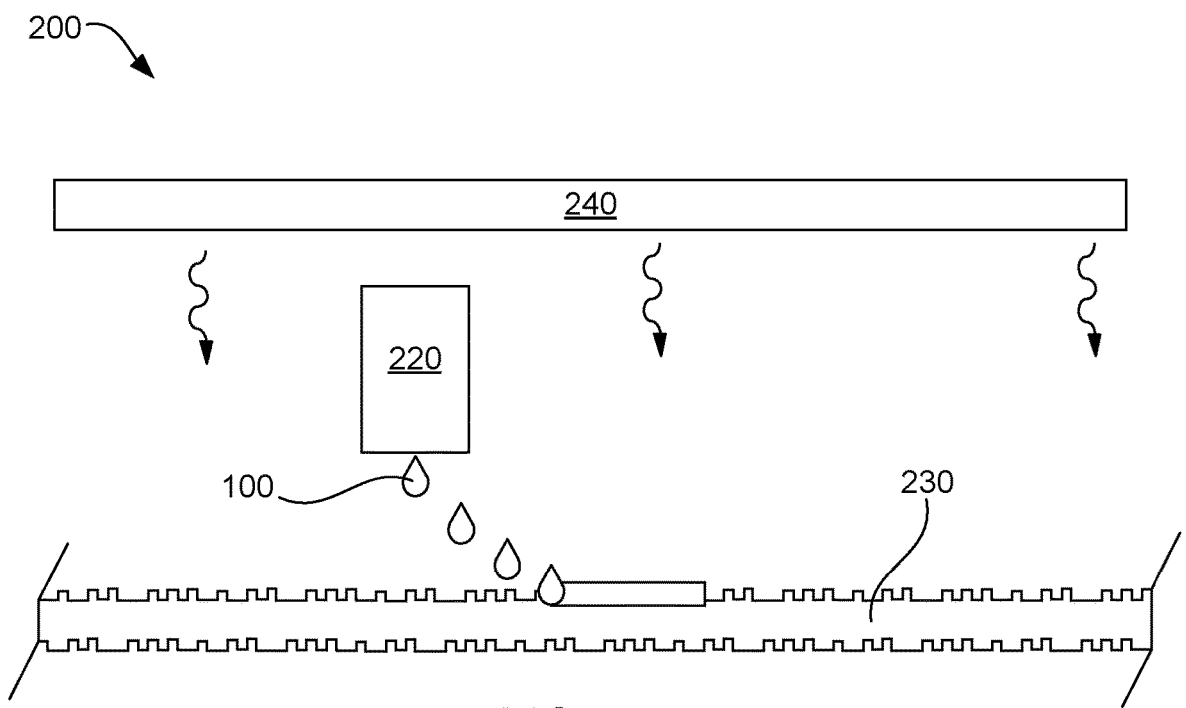
FIG. 2 schematically depicts an example textile printing system including a white ink composition and a fabric substrate in accordance with the present disclosure.

In another example, an example textile printing system, shown at 200 in FIG. 2, can include a fabric substrate 230 and a white ink composition 100. The system may in some examples also include an inkjet printhead 220, such as a thermal inkjet printhead, to eject the white ink composition on the fabric substrate, and a heat curing device 240 to heat the white ink composition after application onto the fabric substrate. The white ink composition in this example includes water, organic co-solvent, dispersed white metal oxide particles and dispersed polyurethane particles. The polyurethane particles and other components can be as described in FIG. 1, for example, or hereinafter. The heat curing device can crosslink the polyurethane particles including at the isocyanate-generated self-crosslinked amines, for example. In another example, the heat curing device to heat the fabric substrate after the white ink composition is printed thereon can be heated to a temperature from 70° C. to 250° C., from 100° C. to 225° C., or from 100° C. to 200° C. for a period of 15 seconds to 10 minutes, from 30 seconds to 5 minutes, from 30 seconds to 2 minutes, from 15 seconds to 1 minute, or from 30 seconds to 90 seconds, for example.

Figure 3:
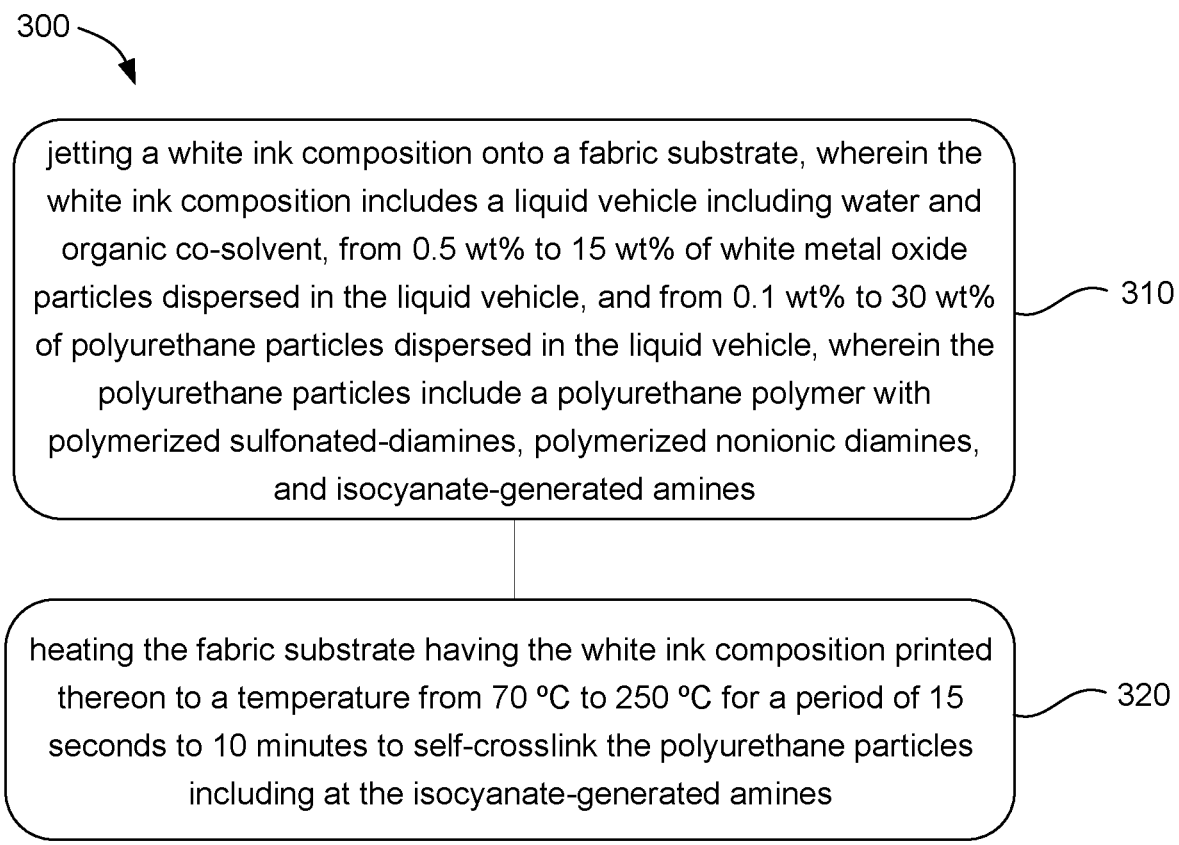
FIG. 3 is a flow diagram of an example method of textile printing in accordance with the present disclosure.

In another example, as shown in FIG. 3, an example method of textile printing is shown at 300, and can include jetting 310 a white ink composition onto a fabric substrate, wherein the white ink composition includes a liquid vehicle including water and organic co-solvent, from 0.5 wt % to 15 wt % of white metal oxide particles dispersed in the liquid vehicle, and from 0.1 wt % to 30 wt % of polyurethane particles dispersed in the liquid vehicle. The polyurethane particles include a polyurethane polymer with polymerized sulfonated-diamines, polymerized nonionic diamines, and isocyanate-generated self-crosslinked amines. The method further includes heating 320 the fabric substrate having the white ink composition printed thereon to a temperature from 70° C. to 250° C. for a period of 15 seconds to 10 minutes to self-crosslink the polyurethane particles. The polymerized sulfonated-diamines can include, for example, multiple amine groups polymerized along a backbone of the polyurethane polymer and a sulfonate group appended to the backbone as part of a side chain therefrom. The polymerized nonionic diamines can include a saturated C2 to C16 alkyl diamine, a C6 to C18 saturated alicyclic diamine, or a C8 to C20 alicyclic-alkyl diamine, for example. The polyurethane particles can have a D50 particle size from 20 nm to 400 nm, and the polyurethane particles can have an acid number from 0 mg KOH/g to 30 mg KOH/g. The fabric substrate can include any of a number of fabrics, such as cotton, polyester, nylon, silk, or a blend thereof. In one example, the method includes preparing the white ink composition by forming a pre-polymer by reacting a diisocyanate with a diol and an excess of isocyanate groups of the diisocyanate present compared to hydroxyl groups present on a diol, wherein the diol includes one or more polymeric diols, forming the polyurethane particles by reacting the pre-polymer with a polymerized sulfonated-diamine and a nonionic diamine, reacting the excess isocyanate groups with water to form isocyanate-generated amino or secondary amines, and co-dispersing the polyurethane particles with white metal oxide particles in a liquid vehicle including the water and the organic co-solvent. However, in one example, there is a polymeric diol present and there are no other types of diols present, e.g., no organic acid diols or other types of diols that are not polymeric in nature.

In further detail, and as a more specific example, in preparation of the polyurethane polymer particles for use in the systems and methods of the present disclosure, multiple steps can be carried out to prepare the particles, including pre-polymer synthesis which includes reaction of a diisocyanate with a polymeric diol. The reaction can occur in the presence of a catalyst in acetone under reflux to give the pre-polymer, in one example. Other reactants may also be used in certain specific examples, such as organic acid diols (in addition to the polymeric diols) to generate acidic moieties along the backbone of the polyurethane particles. The pre-polymer can be prepared with excess isocyanate groups that compared the molar concentration of the alcohol groups found on the polymeric diols or other diols that may be present. By retaining excess isocyanate groups, in the presence of water, the isocyanate groups can generate amino groups or secondary amines along the polyurethane chain, releasing carbon dioxide as a byproduct. This reaction can occur at the time of chain extension during the process of forming the polyurethane particles. Once the pre-polymer is formed, the polyurethane particles can be generated by reacting the pre-polymer with sulfonated diamines, and in some examples, also with nonionic diamines. Thus, the polyurethane particles can be crosslinked and can also include self-crosslinkable moieties. After formation, the solvent can then be removed by vacuum distillation, for example.

Example diisocyanates that can be used to prepare the pre-polymer include 2,2,4 (or 2,4,4)-trimethylhexane-1,6-diisocyanate (TMDI), hexamethylene diisocyanate (HDI), methylene diphenyl diisocyanate (MDI), isophorone diisocyanate (IPDI), and/or 1-Isocyanato-4-[(4-isocyanatocyclohexyl)methyl]cyclohexan (H12MDI), etc., or combinations thereof, as shown below. Others can likewise be used alone, or in combination with these diisocyanates, or in combination with other diisocyanates not shown.

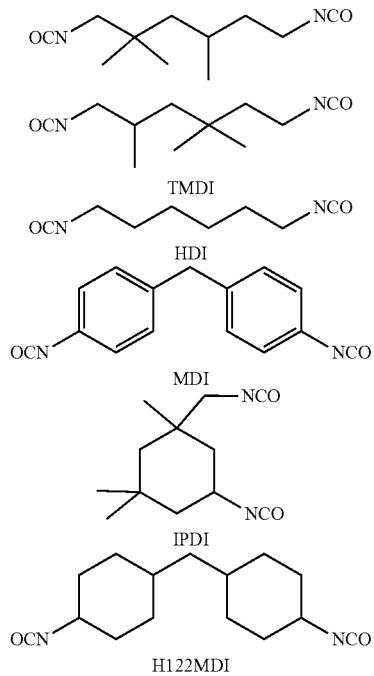

With respect to the polymeric diols that can be used, in one example, the polymeric diol can be a polyester diol, and in another example, the polymeric diol can be a polycarbonate diol, for example. Other diols that can be used include polyether diols, or even combination diols, such as would form a polycarbonate ester polyether-type polyurethane.

With respect to the diamines that can be used in forming the polyurethane particles as described herein, as mentioned, polymerized sulfonated-diamines as well as nonionic diamines can be used. Polymerized sulfonated-diamines can be prepared from diamines by adding carboxylate or sulfonate groups thereto. Nonionic diamines can be diamines that include aliphatic groups that are not charged, such as alkyl groups, alicyclic groups, etc. A charged diamine is not used for the nonionic diamine, if present. Example diamines can include, if also present, various dihydrazides, alkyldihydrazides, sebacic dihydrazides, alkyldioic dihydrazides, aryl dihydrazides, e.g., terephthalic dihydrazide, organic acid dihydrazide, e.g., succinic dihydrazides, adipic acid dihydrazides, etc, oxalyl dihydrazides, azelaic dihydrazides, carbohydrazide, etc. It is noted however that these examples may not be appropriate for use for one or the other type of diamine, but rather, this list is provided as being inclusive of the types of diamines that can be used in forming the polymerized sulfonated-diamines and/or the non-ionic diamines, and not both in every instance (though some can be used for either type of diamine).

Example diamine structures are shown below. More specific examples of diamines include 4,4'-methylenebis(2-methylcyclohexyl-amine) (DMDC), 4-methyl-1,3'-cyclohexanediamine (HTDA), 4,4'-Methylenebis(cyclohexylamine) (PACM), isphorone diamine (IPDA), tetramethylethylenediamine (TMDA), ethylene diamine (DEA), 1,4-cyclohexane diamine, 1,6-hexane diamine, hydrazine, adipic acid dihydrazide (AAD), carbohydrazide (CHD), and/or diethylene triamine (DETA), notably, DETA includes three amines, and thus, is a triamine. However, since it also includes 2 amines, it is considered to fall within the definition herein of "diamine," meaning it includes two amines. Many of the diamine structures shown below can be used as a nonionic diamine, such as the uncharged aliphatic diamines shown below. Likewise, many or all of the diamines shown below can be sulfonated for use as a polymerized sulfonated-diamine.

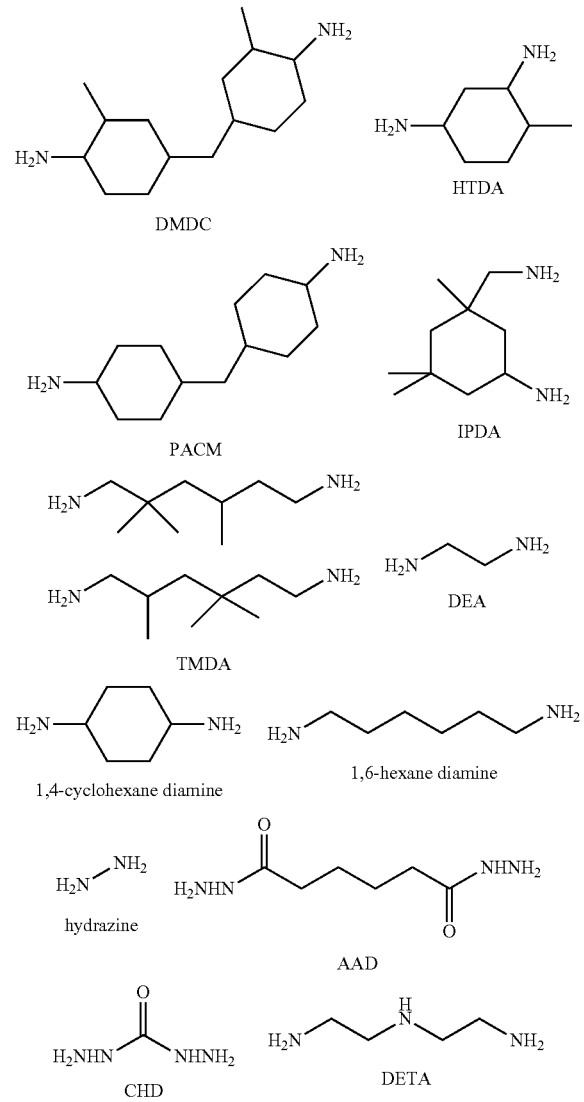

There are also other alkyl diamines (other than 1,6-hexane diamine) that can be uses, such as, by way of example:

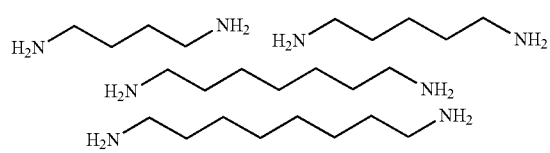

-continued

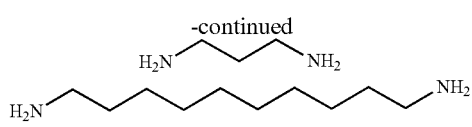

There are also other dihydrazides (other than AAD shown above) that can be used, though it is noted that these can be used in addition to the nonionic diamines as described herein, as dihydrazides are not considered to be nonionic diamines. Example dihydrazides that can be use include, by way of example:

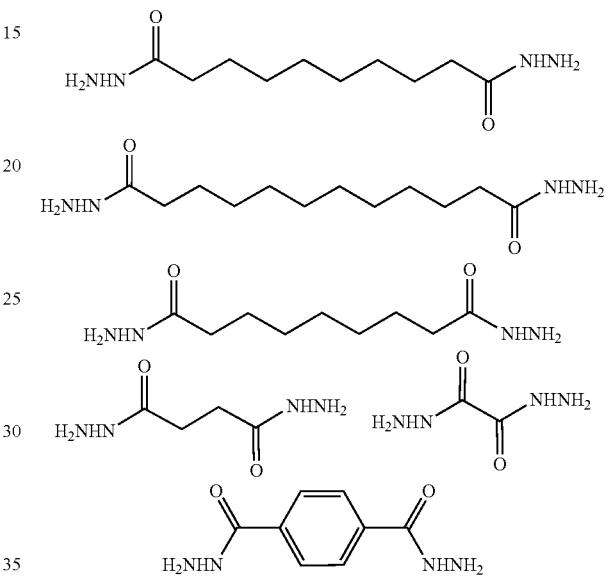

As an example of a sulfonated diamine, which in this case is an alkylamine-alkylamine-sulfonate (shown as a sulfonic acid, but as a sulfonate, would include a positive counterion associated with an $SO_3$-group), that can be used is shown in Formula I below, though there are others including those based on structures shown above.

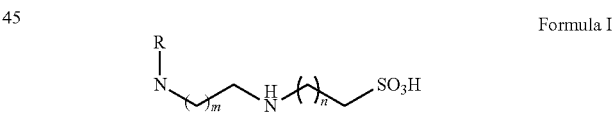

Formula I where R is H or is C1 to C10 straight- or branched-alkyl or alicyclic or combination of alkyl and alicyclic, m is 1 to 5, and n is 1 to 5. One example of such a structure sold by Evonik Industries (USA) is A-95, which is exemplified where R is H, m is 1, and n is 1. Another example structure sold by Evonik Industries is Vestamin®, where R is H, m is 1, and n is 2.

Figure 4:
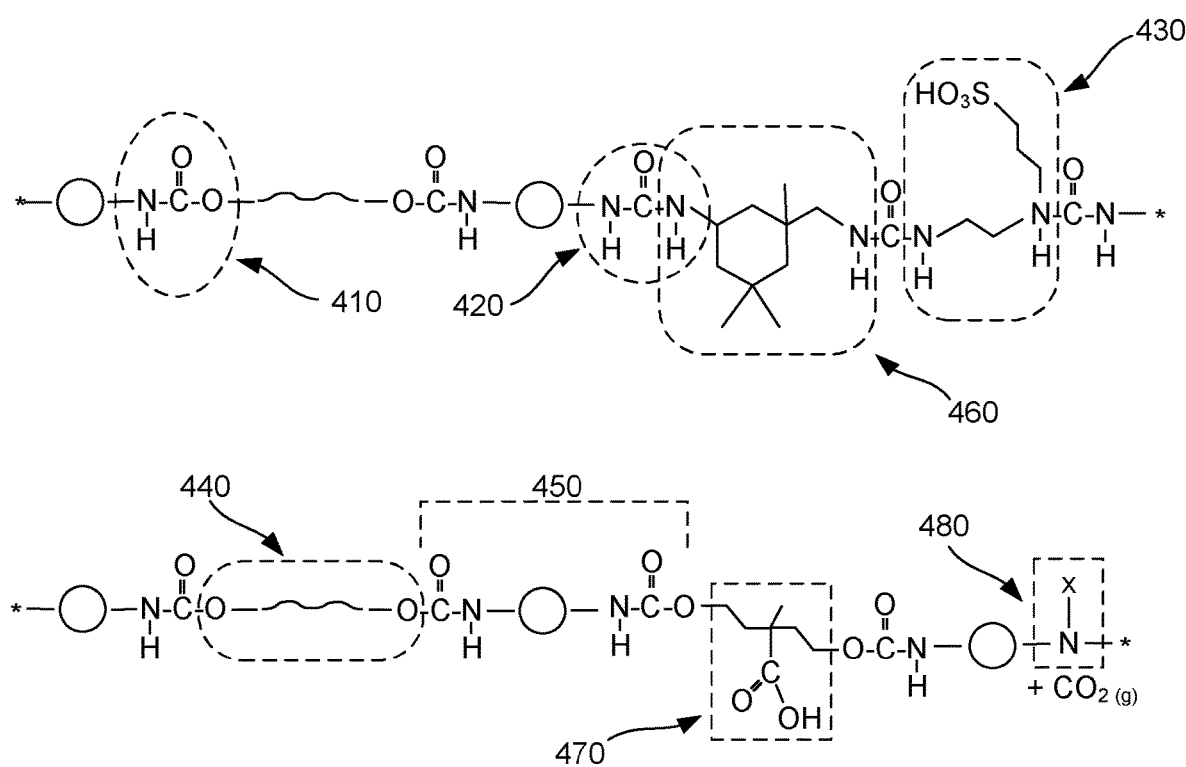
FIG. 4 shows example portions of polyurethane polymer that can be present as part of polyurethane particles dispersed in white ink compositions in accordance with the present disclosure.

FIG. 4 provides example portions of polyurethane polymer that can be present as part of the polyurethane particles described herein. This FIG. does not show the cross-linking, but rather shows the types of groups or moieties that can be present along the polyurethane polymer of the polyurethane particles, some of which can be available for internal cross-linking. In FIG. 4, one of the polyurethane polymer portions shown identifies a urethane group 410, a urea group 420, an example polymerized sulfonated-diamine 430 (with the amines being present along the polymer backbone, e.g., backbone portion including [—$NH_2CH_2CH_2NH$-] with a side-chain portion including [—CH$_2$CH$_2$CH$_2$SO$_3$H], and an example nonionic diamine 460, which in this case is an isophorone diamine moiety (or nonionic C10 aliphatic diamine that includes both alkyl groups, e.g., methyl, as well as a 6-membered alicyclic ring). Another portion of the polyurethane particle is graphically present which includes a polymerized polymeric diol 440, where the oxygens of the diol (upon removal of the hydrogen) are used in forming either urethane or urea linkages, for example. Polymeric diols (and in some instances other types of diols) along with diisocyanates, which are shown as polymerized diisocyanates 450 in this FIG., can be used to form a pre-polymer that can be further modified to include some of the other moieties shown by example in this FIG. to thus form the polyurethane particles used in the white ink compositions of the present disclosure. The polymerized diisocyanates are shown as including urethane linkage groups on either side of a central moiety, with the oxygen being provided by the diols. The central circle portion in this FIG. is used to represent one or more different types of diisocyanates. In this example, one of the polymerized diols shown as being included is a polymerized organic acid diol 470, which provides a carboxylic acid side group attached directly to the polyurethane polymer backbone and in this instance is generated from an organic acid diol, e.g., 2,2-bis(hydroxymethyl)propionic acid in this instance, prior to polymerization into the polyurethane polymer. If an organic acid diol is used, it can be used in addition to the polymeric diol, thus, providing a carboxylate group coupled directly to a polymer backbone of the polyurethane polymer in addition to the polymeric or oligomeric portions provided by the polymeric diol. That stated, many examples herein do not include this type of polymerized diol, so this polymerized diol is shown by way of example as a moiety that may or may not be included. Also shown in this FIG. is an isocyanate-generated amine group 480, which is shown in this example as being crosslinked (notated by "x") to another portion of the polyurethane polymer or another polyurethane polymer strand of the polyurethane particles. In other words, the isocyanate-generated amines may not remain as amines for an extended period of time, as they may be in a condition for crosslinking after formation with other portions of the polyurethane polymer(s) of the polyurethane particle. Thus, in examples of the present disclosure, the polyurethane polymer can be self-crosslinked, and can include the polymerized sulfonated-diamine, the nonionic diamine, and the isocyanate-generated amine group that becomes self-crosslinked. In some examples, it is noted that the amino group shown can further react with isocyanates to form additional urethane bonds for crosslinking reactions. Also, notably, there can be amino groups or secondary amines present that remain available for additional crosslinking. Though not shown, the polyurethane polymer may likewise include dihydrazides copolymerized into the polyurethane polymer, but in many examples herein, dihydrazides are not included.

The textile printing systems and methods described herein can be suitable for printing on many types of textiles, such as cotton fibers, including treated and untreated cotton substrates, polyester substrates, nylons, blended substrates thereof, etc. Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources such as cornstarch, tapioca products, or sugarcanes, etc. Example synthetic fibers that can be used include polymeric fibers such as nylon fibers (also referred to as polyamide fibers), polyvinyl chloride (PVC) fibers, PVC-free fibers made of polyester, polyamide, polyimide, polyacrylic, polypropylene, polyethylene, polyurethane, polystyrene, polyaramid, e.g., Kevlar® (E. I. du Pont de Nemours Company, USA), polytetrafluoroethylene, fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both of the polymeric fiber and a surface of the fabric, a plasma treatment, a solvent treatment, acid etching, or a biological treatment, an enzyme treatment, or antimicrobial treatment to prevent biological degradation.

As mentioned, in some examples, the fabric substrate can include natural fiber and synthetic fiber, e.g., cotton/polyester blend. The amount of the individual fiber types can vary. For example, the amount of the natural fiber can vary from 5 wt % to 95 wt % and the amount of synthetic fiber can range from 5 wt % to 95 wt %. In yet another example, the amount of the natural fiber can vary from 10 wt % to 80 wt % and the synthetic fiber can be present from 20 wt % to 90 wt %. In other examples, the amount of the natural fiber can be 10 wt % to 90 wt % and the amount of synthetic fiber can also be 10 wt % to 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

The fabric substrate can be in one of many different forms, including, for example, a textile, a cloth, a fabric material, fabric clothing, or other fabric product suitable for applying ink, and the fabric substrate can have any of a number of fabric structures, including structures that can have warp and weft, and/or can be woven, non-woven, knitted, tufted, crocheted, knotted, and pressured, for example. The terms "warp" as used herein, refers to lengthwise or longitudinal yarns on a loom, while "weft" refers to crosswise or transverse yarns on a loom.

It is notable that the term "fabric substrate" or "fabric media substrate" does not include materials such as any paper (even though paper can include multiple types of natural and synthetic fibers or mixtures of both types of fibers). Fabric substrates can include textiles in filament form, textiles in the form of fabric material, or textiles in the form of fabric that has been crafted into a finished article, e.g., clothing, blankets, tablecloths, napkins, towels, bedding material, curtains, carpet, handbags, shoes, banners, signs, flags, etc. In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include but is not limited to, fabric with a plain weave structure, fabric with a twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process, e.g., a solvent treatment, a mechanical treatment process, e.g., embossing, a thermal treatment process, or a combination of multiple processes.

The fabric substrate can have a basis weight ranging from 10 grams per square meter (gsm) to 500 gsm. In another example, the fabric substrate can have a basis weight ranging from 50 gsm to 400 gsm. In other examples, the fabric substrate can have a basis weight ranging from 100 gsm to 300 gsm, from 75 gsm to 250 gsm, from 125 gsm to 300 gsm, or from 150 gsm to 350 gsm.

In addition, the fabric substrate can contain additives including, but not limited to, colorant (e.g., white metal oxide particles, dyes, and tints), antistatic agents, brightening agents, nucleating agents, antioxidants, UV stabilizers, and/or fillers and lubricants, for example. Alternatively, the fabric substrate may be pre-treated in a solution containing the substances listed above before applying other treatments or coating layers.

Regardless of the substrate, whether natural, synthetic, blend thereof, treated, untreated, etc., the fabric substrates printed with the white ink composition of the present disclosure can provide acceptable L* values (CIELAB L*a*b* color space) and/or washfastness properties. The term "washfastness" can be defined as the L* value that is retained or delta E ($\Delta E$) after five (5) standard washing machine cycles using warm water and a standard clothing detergent (e.g., Tide@ available from Proctor and Gamble, Cincinnati, OH, USA). By measuring L* (e.g., L*a*b* color space value) both before and after washing, $\Delta L*$ and $\Delta E$ value can be determined, which can be a quantitative way of expressing the washfastness both prior to and after undergoing the washing cycles. The higher the L* value, the higher the level of whiteness, and the lower the $\Delta E$ values, the less change has occurred before and after the washfastness challenge. In further detail, $\Delta E$ is a single number that represents the "distance" between colors (or in this case, two levels of whiteness), which in accordance with the present disclosure, is the white image prior to washing and the modified white image after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the $\Delta E$ value calculated based on subtracting the pre-washing color values of L*, a*, and b* from the post-washing color values of L*, a*, and b*. Those values can then be squared, and then a square root of the sum can be determined to arrive at the $\Delta E$ value. The 1976 standard can be referred to herein as "$\Delta E_{CIE}$." The CIE definition was modified in 1994 to address some perceptual non-uniformities, retaining the L*a*b* color space, but modified to define the L*a*b* color space with differences in lightness (L*), chroma (C*), and hue (h*) calculated from L*a*b* coordinates. Then in 2000, the CIEDE standard was established to further resolve the perceptual non-uniformities by adding five corrections, namely i) hue rotation ($R_T$) to deal with the problematic blue region at hue angles of about 275°), ii) compensation for neutral colors or the primed values in the L*C*h differences, iii) compensation for lightness ($S_L$), iv) compensation for chroma ($S_C$), and v) compensation for hue ($S_H$). The 2000 modification can be referred to herein as "$\Delta E_{2000}$." In accordance with examples of the present disclosure, $\Delta E$ value can be determined using the CIE definition established in 1976, 1994, and 2000 to demonstrate washfastness. However, in the examples of the present disclosure, $\Delta E_{CIE}$ and $\Delta E_{2000}$ are used.

As a further note, L* of the CIELAB color space values can likewise be used to express the darkness of a fabric substrate in examples where the white ink compositions of the present disclosure are used to print on dark fabric substrates. L* values of 15 to 50, or from 20 to 45, may be used to characterize dark fabric substrates, for example.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "acid value" or "acid number" refers to the mass of potassium hydroxide (KOH) in milligrams that can be used to neutralize one gram of substance (mg KOH/g), such as the polyurethane particles or other polymers disclosed herein. This value can be determined, in one example, by dissolving or dispersing a known quantity of a material in organic solvent and then titrating with a solution of potassium hydroxide (KOH) of known concentration for measurement.

"D50" particle size is defined as the particle size at which about half of the particles are larger than the D50 particle size and about half of the other particles are smaller than the D50 particle size (by weight based on the particle content of the particular component where particle size is provided). As used herein, particle size with respect to the polyurethane particles or white (or colorless) metal oxide particles can be based on volume of the particle size normalized to a spherical volume for diameter measurement, for example. Likewise, the "D95" is defined as the particle size at which about 5 wt % of the particles are larger than the D95 particle size and about 95 wt % of the remaining particles are smaller than the D95 particle size. Particle size can be collected using a Malvern Zetasizer, for example. Particle size information can also be determined and/or verified using a scanning electron microscope (SEM).

As used herein, a plurality of items, structural elements, compositional elements, and/or materials may be presented in a common list for convenience. However, these lists are be construed as though individual members of the list are individually identified as a separate and unique member. Thus, no individual member of such list is to be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and are to be interpreted flexibly to include not only the numerical values explicitly recited as the limits of the range, but also to include all the individual numerical values or sub-ranges encompassed within that range as if individual numerical values and sub-ranges are explicitly recited. For example, a weight ratio range of about 1 wt % to about 20 wt % can be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is merely illustrative of the methods and systems herein. Numerous modifications and alternative methods and systems may be devised without departing from the present disclosure. Thus, while the technology has been described above with particularity, the following provides further detail in connection with what are presently deemed to be the acceptable examples.

Example 1—Preparation of Polyurethane Dispersion (D1)

72.410 grams of polyester diol (PED; Stepanol® PC-1015-55 from Stephan, USA), and 20.511 grams of isophorone diisocyanate (IPDI) in 80 grams of acetone were mixed in a 500 ml of 4-neck round bottom flask. A mechanical stirrer with a glass rod and a polytetrafluoroethylene (PTFE) blade was attached. A condenser was attached. The flask was immersed in a constant temperature bath at 75° C. The system was kept under a drying tube. 3 drops of dibutyltin dilaurate (DBTDL) was added to initiate the polymerization. Polymerization was continued for 6 hours at 75° C. 0.5 gram samples were withdrawn for wt % NCO titration to confirm the reaction. The theoretical wt % NCO value was 5.13 wt %. The measured wt % NCO value was 5.10 wt %. The polymerization temperature was reduced to 50° C. 4.109 grams of isophorone diamine (IPDA), 5.941 grams of a (sodium) sulfonated-alkyl diamine (ADA), $NH_2CH_2CH_2NHCH_2CH_2CH_2SO_3^-$:$Na^+$, at 50 wt % in water and 14.819 grams of deionized water were mixed in a beaker until the IPDA and the ADA was dissolved. The ADA is commercially available as A-95 by Evonik Industries, USA. The IPDA and ADA solution was added to the pre-polymer solution at 50° C. with vigorous stirring over 5 minutes. The solution became viscous and slightly hazy. The mixture continued to stir for 30 minutes at 50° C. Then cold 201.713 grams of deionized water was added to the polymer mixture in a 4-neck round bottom flask over 10 minutes with good agitation to form PUD dispersion. The agitation was continued for 60 minutes at 50° C. The PUD dispersion was filtered through a 400 mesh stainless sieve. Acetone was removed with a rotary evaporator at 50° C. with 20 milligrams of added BYK-011 de-foaming agent. The final PUD dispersion was filtered through fiber glass filter paper. Average particle size was measured by a Malvern Zetasizer at 203.4 nm. The pH was 7. The solid content was 29.44 wt %.

Example 2—Preparation of Polyurethane Dispersion (D2)

73.222 grams of polyester diol (PED; Stepanol® PC-1015-55 from Stephan, USA), and 19.620 grams of 2,2,4 (or 2,4,4)-trimethylhexane-1,6-diisocyanate (TMDI) in 80 grams of acetone were mixed in a 500 ml of 4-neck round bottom flask. A mechanical stirrer with a glass rod and a polytetrafluoroethylene (PTFE) blade was attached. A condenser was attached. The flask was immersed in a constant temperature bath at 75° C. The system was kept under a drying tube. 3 drops of dibutyltin dilaurate (DBTDL) was added to initiate the polymerization. Polymerization was continued for 6 hours at 75° C. 0.5 gram samples were withdrawn for wt % NCO titration to confirm the reaction. The theoretical wt % NCO value was 5.19 wt %. The measured wt % NCO value was 5.15 wt %. The polymerization temperature was reduced to 50° C. 4.155 grams of isophorone diamine (IPDA), 6.007 grams of a (sodium) sulfonated-alkyl diamine (ADA), $NH_2CH_2CH_2NHCH_2CH_2CH_2SO_3^-$:$Na^+$, at 50 wt % in water and 14.819 grams of deionized water were mixed in a beaker until the IPDA and the ADA was dissolved. The IPDA and ADA solution was added to the pre-polymer solution at 50° C. with vigorous stirring over 5 minutes. The solution became viscous and slightly hazy. The mixture continued to stir for 30 minutes at 50° C. Then cold 201.640 grams of deionized water was added to the polymer mixture in a 4-neck round bottom flask over 10 minutes with good agitation to form PUD dispersion. The agitation was continued for 60 minutes at 50° C. The PUD dispersion was filtered through a 400 mesh stainless sieve. Acetone was removed with a rotary evaporator at 50° C. with 20 milligrams of added BYK-011 de-foaming agent. The final PUD dispersion was filtered through fiber glass filter paper. Average particle size was measured by a Malvern Zetasizer at 188.6 nm. The pH was 7. The solids content was 32.74 wt %.

Example 3—Preparation of Polyurethane Dispersion (D3)

74.334 grams of polyester diol (PED; Stepanol® PC-1015-55 from Stephan, USA), and 18.399 grams of 1,3-bis(isocyanatomethyl)cyclohexane (Takenate 600, H6XDI) in 80 grams of acetone were mixed in a 500 ml of 4-neck round bottom flask. A mechanical stirrer with a glass rod and a polytetrafluoroethylene (PTFE) blade was attached. The flask was immersed in a constant temperature bath at 75° C. The system was kept under a drying tube. 3 drops of dibutyltin dilaurate (DBTDL) was added to initiate the polymerization. Polymerization was continued for 6 hours at 75° C. 0.5 gram samples were withdrawn for wt % NCO titration to confirm the reaction. The theoretical wt % NCO value was 5.28 wt %. The measured wt % NCO value was 5.25 wt %. The polymerization temperature was reduced to 50° C. 4.218 grams of isophorone diamine (IPDA), 6.098 grams of a (sodium) sulfonated-alkyl diamine (ADA), $NH_2CH_2CH_2NHCH_2CH_2CH_2SO_3^-$:$Na^+$, at 50 wt % in water and 15.248 grams of deionized water were mixed in a beaker until the IPDA and the ADA was dissolved. The IPDA and ADA solution was added to the pre-polymer solution at 50° C. with vigorous stirring over 5 minutes. The solution became viscous and slightly hazy. The mixture continued to stir for 30 minutes at 50° C. Then cold 201.521 grams of deionized water was added to the polymer mixture in a 4-neck round bottom flask over 10 minutes with good agitation to form PUD dispersion. The agitation was continued for 60 minutes at 50° C. The PUD dispersion was filtered through a 400 mesh stainless sieve. Acetone was removed with a rotary evaporator at 50° C. with 20 milligrams of added BYK-011 de-foaming agent. The final PUD dispersion was filtered through fiber glass filter paper. Average particle size was measured by a Malvern Zetasizer at 178.7 nm. The pH was 7. The solids content was 34.15 wt %.

Example 4—Preparation of Polyurethane Dispersion (D4)

72.620 grams of polyester diol (PED; Stepanol® PC-1015-55 from Stephan, USA), and 20.570 grams of isophorone diisocyanate (IPDI) in 80 grams of acetone were mixed in a 500 ml of 4-neck round bottom flask. A mechanical stirrer with a glass rod and a polytetrafluoroethylene (PTFE) blade was attached. The flask was immersed in a constant temperature bath at 75° C. The system was kept under a drying tube. 3 drops of dibutyltin dilaurate (DBTDL) was added to initiate the polymerization. Polymerization was continued for 6 hours at 75° C. 0.5 gram samples were withdrawn for wt % NCO titration to confirm the reaction. The theoretical wt % NCO value was 5.13 wt %. The measured wt % NCO value was 5.10 wt %. The polymerization temperature was reduced to 50° C. 3.830 grams of 2,2,4 (or 2,4,4)-trimethylhexane-1,6-diamine (TMDA), 5.941 grams of a (sodium) sulfonated-alkyl diamine (ADA), $NH_2CH_2CH_2NHCH_2CH_2CH_2SO_3^-$:$Na^+$, at 50 wt % in water and 14.819 grams of deionized water were mixed in a beaker until the TMDA and the ADA was dissolved. The TMD and ADA solution was added to the pre-polymer solution at 50° C. with vigorous stirring over 5 minutes. The solution became viscous and slightly hazy. The mixture continued to stir for 30 minutes at 50° C. Then cold 201.713 grams of deionized water was added to the polymer mixture in a 4-neck round bottom flask over 10 minutes with good agitation to form a polyurethane dispersion. The agitation was continued for 60 minutes at 50° C. The polyurethane dispersion was filtered through a 400 mesh stainless sieve. Acetone was removed with a rotary evaporator at 50° C. with 20 milligrams of added BYK-011 de-foaming agent. The final polyurethane dispersion was filtered through fiber glass filter paper. Average particle size was measured by a Malvern Zetasizer at 156.8 nm. The pH was 7. The solids content was 34.5 wt %.

Example 5—Preparation of Polyurethane Dispersion (D5)

69.897 grams of polyester diol (PED; Stepanol® PC-1015-55 from Stephan, USA), and 19.799 grams of isophorone diisocyanate (IPDI) in 80 grams of acetone were mixed in a 500 ml of 4-neck round bottom flask. A mechanical stirrer with a glass rod and a polytetrafluoroethylene (PTFE) blade was attached. The flask was immersed in a constant temperature bath at 75° C. The system was kept under a drying tube. 3 drops of dibutyltin dilaurate (DBTDL) was added to initiate the polymerization. Polymerization was continued for 6 hours at 75° C. 0.5 gram samples were withdrawn for wt % NCO titration to confirm the reaction. The theoretical wt % NCO value was 5.13 wt %. The measured wt % NCO value was 5.10 wt %. The polymerization temperature was reduced to 50° C. 0.642 grams of isophorone diamine (IPDA), 19.325 grams of a (sodium) sulfonated-alkyl diamine (ADA), $NH_2CH_2CH_2NHCH_2CH_2CH_2SO_3^-$:$Na^+$, at 50 wt % in water and 14.819 grams of deionized water were mixed in a beaker until the IPDA and the ADA was dissolved. The IPDA and ADA solution was added to the pre-polymer solution at 50° C. with vigorous stirring over 5 minutes. The solution became viscous and slightly hazy. The mixture continued to stir for 30 minutes at 50° C. Then cold 171.492 grams of deionized water was added to the polymer mixture in a 4-neck round bottom flask over 10 minutes with good agitation to form polyurethane dispersion. The agitation was continued for 60 minutes at 50° C. The polyurethane dispersion was filtered through a 400 mesh stainless sieve. Acetone was removed with a rotary evaporator at 50° C. with 20 milligrams of added BYK-011 de-foaming agent. The final polyurethane dispersion was filtered through fiber glass filter paper. Average particle size was measured by a Malvern Zetasizer at 42.37 nm. The pH was 7. The solids content was 30.99 wt %.

Example 6—Preparation of Polyurethane Dispersion (D6)

71.718 grams of polyester diol (PED; Stepanol® PC-1015-55 from Stephan, USA), and 20.315 grams of isophorone diisocyanate (IPDI) in 80 grams of acetone were mixed in a 500 ml of 4-neck round bottom flask. A mechanical stirrer with a glass rod and a polytetrafluoroethylene (PTFE) blade was attached. The flask was immersed in a constant temperature bath at 75° C. The system was kept under a drying tube. 3 drops of dibutyltin dilaurate (DBTDL) was added to initiate the polymerization. Polymerization was continued for 6 hours at 75° C. 0.5 gram samples were withdrawn for % NCO titration to confirm the reaction. The theoretical wt % NCO value was 5.13 wt %. The measured wt % NCO value was 5.10 wt %. The polymerization temperature was reduced to 50° C. 5.025 grams of 4,4-methylenebis(cyclohexaneamine) (PACM), 5.884 grams of a (sodium) sulfonated-alkyl diamine (ADA), $NH_2CH_2CH_2NHCH_2CH_2CH_2SO_3^-$:$Na^+$, at 50 wt % in water and 14.819 grams of deionized water were mixed in a beaker until the PACM and the ADA was dissolved. The IPDA and ADA solution was added to the pre-polymer solution at 50° C. with vigorous stirring over 5 minutes. The solution became viscous and slightly hazy. The mixture continued to stir for 30 minutes at 50° C. Then cold 202.758 grams of deionized water was added to the polymer mixture in a 4-neck round bottom flask over 10 minutes with good agitation to form a polyurethane dispersion. The agitation was continued for 60 minutes at 50° C. The polyurethane dispersion was filtered through a 400 mesh stainless sieve. Acetone was removed with a rotary evaporator at 50° C. with 20 milligrams of added BYK-011 de-foaming agent. The final polyurethane dispersion was filtered through fiber glass filter paper. Average particle size was measured by a Malvern Zetasizer at 128.3 nm. The pH was 7. The solids content was 32.78 wt %.

Example 7—Comparative Table of Polyurethane Dispersions (D1-D6)

Table 1A and 1B provides a summary comparison of the polyurethane dispersions prepared in accordance with Examples 1-6, which are coded in the respective Example headers and the following Tables as D1-D6, respectively.

TABLE 1A

| Polyurethane Dispersions (Approx. Parts by Weight of Polymer) | | | | |
|---|---|---|---|---|
| Ingredients | Category | D1 | D2 | D3 |
| Polyester Diol (PED) | Polymeric Diol | 72.41 | 73.22 | 74.33 |
| Sodium Sulfonated-alkyl Diamine (ADA) | Sulfonated-Diamine | 5.94 | 6.01 | 6.10 |

TABLE 1A-continued

Polyurethane Dispersions (Approx. Parts by Weight of Polymer)

| Ingredients | Category | D1 | D2 | D3 |
|---|---|---|---|---|
| 2,2,4 (or 2,4,4)-Trimethylhexane-1,6-Diamine (TMDA) | Nonionic Diamine | — | — | — |
| Isophorone Diamine (IPDA) | Nonionic Diamine | 4.11 | 4.16 | 4.22 |
| 1,3-Bis(isocyanatomethyl) cyclohexane (H6XDI) | Diisocyanate | — | — | 18.40 |
| 2,2,4 (or 2,4,4)-Trimethylhexane-1,6-Diisocyanate (TMDI) | Diisocyanate | — | 19.62 | — |
| Isophorone Diisocyanate (IPDI) | Diisocyanate | 20.51 | — | — |
| Properties | | | | |
| pH | | 7 | 7 | 7 |
| Solids Content (wt %) | | 29.44 | 32.74 | 34.15 |
| D50 Particle Size (nm) | | 203.4 | 188.6 | 178.7 |
| Acid Number (mg KOH/g) | | *8.8 | 5.41 | 4.92 |

*theoretical

TABLE 1B

Polyurethane Dispersions (Approx. Parts by Weight of Polymer)

| Ingredients | Category | D4 | D5 | D6 |
|---|---|---|---|---|
| Polyester Diol (PED) | Polymeric Diol | 72.62 | 69.90 | 71.72 |
| Sodium sulfonated-alkyl Diamine (ADA) | Sulfonated-Diamine | 5.94 | 19.33 | 5.88 |
| 2,2,4 (or 2,4,4)-Trimethylhexane-1,6-Diamine (TMDA) | Nonionic Diamine | 3.83 | — | — |
| Isophorone Diamine (IPDA) | Nonionic Diamine | — | 0.64 | — |
| 4,4-methylenebis (cyclohexaneamine) (PACM) | Nonionic Diamine | — | — | 5.025 |
| Isophorone Diisocyanate (IPDI) | Diisocyanate | 20.57 | 19.80 | 20.32 |
| Properties | | | | |
| pH | | 7 | 7 | 7 |
| Solids Content (wt %) | | 34.5 | 30.99 | 32.78 |
| D50 Particle Size (nm) | | 156.8 | 42.37 | 128.3 |
| Acid Number (mg KOH/g) | | *8.8 | *28.5 | *8.7 |

*theoretical

Example 8—White Ink Compositions

White ink compositions are prepared using polyurethane dispersions D1 to D6. The white ink compositions are formulated in accordance with one of two different base formulations, shown in Table 2, as follows:

TABLE 2

Formulations for White Ink Compositions

| Ingredients | Category | Ink 1 (wt %) | Ink 2 (wt %) |
|---|---|---|---|
| Glycerol | Organic Co-solvent | 9 | 9 |
| LEG-1 | Organic Co-solvent | 1 | 1 |
| Dowanol™ TPM | Organic Co-solvent | 2 | 2 |
| Surfynol® 440 | Surfactant | 0.3 | 0.3 |
| Acticide® B20 | Biocide | 0.2 | — |
| Polyurethane Dispersions D1-D6 (or comparative Impranil® DLN-SD) | Polyurethane Particles | 8* | 8* |
| Titanium Dioxide | Dispersed White Metal Oxide Particles | 10 | 10 |
| Water | Solvent | Balance | Balance |

*Polyurethane wt % based on solids content of polyurethane particles, excluding liquid carrier.
Dowanol™ TPM is a tripropylene glycol methyl ether available from Dow (USA).
Surfynol® is available from Evonik, (Canada).
Acticide® is available from Thor Specialties, Inc. (USA).

As a note, the data collected in Examples 9-12 which included the polyurethane particles of the present disclosure was based specifically on polyurethane particles from dispersions D1, D2, and D4. For comparison, the formulations of Ink 1 and Ink 2 were also prepared using Impranil® DLN-SD (Covestro, Germany) to provide the polyurethane particles. Impranil® DLN-SD was selected because it is a commercially available polyurethane with generally industry standard properties. Impranil® DLN-SD does not include the combination of polymerized sulfonated-diamines, polymerized nonionic diamines, and isocyanate-generated self-crosslinked amines.

Example 9—Heat-Cured White Ink Composition Durability on Black Fabric Substrates Several prints were prepared by applying white ink composition durability plots at 3 dots per pixel (dpp) onto black cotton fabrics, namely Gildan Black 780 Cotton Fabric and Pakistan #10 Cotton Fabric. The Gildan Black 780 and the Pakistan #10 fabrics are both considered to be 100 wt % cotton, but the additives used in the two samples caused the Gildan Black 780 to be more hydrophilic than the Pakistan #10 black cotton fabric. After printing, the white ink compositions were cured on the respective fabrics at 150° C. at 5 psi for 3 minutes. After curing, initial L* values from the CIELAB L*a*b* values were recorded, the various printed fabrics were exposed to 5 washing machine complete wash cycles using conventional washing machines at 40° C. with detergent, e.g., Tide@, with air drying in between wash cycles. After 5 washes, the L* value was recorded a second time for comparison, and $\Delta E_{CIE}$ calculated. Also, for comparison purposes, the polyurethane particles of the present disclosure were compared to Impranil® DLN-SD, which is a commercially available polyurethane, but is dissimilar with respect to the presently prepared D1-D6 polyurethane polymer of the present disclosure. In addition to the Impranil® DLN-SD comparative, data was collected from Ink 1 and Ink 2; polyurethanes D1, D2, and D4; and two different thermal inkjet printheads, namely thermal inkjet pent Part ID Nos. A8160 and A12000, both available from HP, Inc. (USA). Two different pens were tested as they have different architecture, e.g., circular vs. non-circular bore. Data collected is shown in Tables 3A and 3B, as follows:

TABLE 3A

Durability of White Ink Compositions
Printed and Heat-Cured on Black 100 wt % Cotton Fabrics

| | | | | 150° C. Curing | | | |
| --- | --- | --- | --- | --- | --- | --- | --- |
| Ink ID | PU Disp. ID | Pen ID | Fabric ID | Initial L* | L* 5 wash | % ΔL | $\Delta_{CIE}$ |
| Ink 1 | Impranil ® DLN-SD | A8160 | Gildan Black 780 | 77.8 | 76.4 | −1.5 | 1.7 |
| Ink 1 | D1 | A8160 | Gildan Black 780 | 74.3 | 73.5 | −0.8 | 1.1 |
| Ink 1 | D2 | A8160 | Gildan Black 780 | 78.5 | 77.6 | −0.9 | 1.0 |
| Ink 1 | D4 | A8160 | Gildan Black 780 | 75.4 | 73.2 | −2.2 | 2.2 |
| Ink 1 | Impranil ® DLN-SD | A8160 | Pakistan #10 | 87.5 | 88.3 | 0.7 | 1.6 |
| Ink 1 | D1 | A8160 | Pakistan #10 | 86.8 | 85.8 | −1.1 | 1.2 |
| Ink 1 | D2 | A8160 | Pakistan #10 | 88.2 | 87.2 | −1.0 | 2.6 |
| Ink 1 | D4 | A8160 | Pakistan #10 | 87.7 | 87.8 | 0.2 | 0.7 |

Impranil ® DLN-SD is available from Covestro (Germany).

TABLE 3B

Durability of White Ink Compositions
Printed and Heat-Cured on Black 100 wt % Cotton Fabrics

| | | | | | | | 150° C. Curing | | |
| --- | --- | --- | --- | --- | --- | --- | --- | --- | --- |
| Ink ID | PU Disp. ID | Pen ID | Fabric ID | Initial L* | L* 5 wash | % ΔL | $\Delta E_{CIE}$ | $\Delta E_{2000}$ | $\Delta E_{CMC}$ (2:1) |
| Ink 2 | D4 | A8160 | Gildan Black 780 | 77.9 | 77.3 | −0.7 | 1.05 | 0.86 | 0.93 |
| Ink 2 | D4 | A8160 | Gildan Black 780 | 80.0 | 79.0 | −1.0 | 1.27 | 1.00 | 0.93 |
| Ink 2 | D4 | A8160 | Gildan Black 780 | 81.1 | 80.5 | −0.6 | 0.99 | 0.80 | 0.90 |
| Ink 2 | D2 | A8160 | Gildan Black 780 | 80.3 | 79.7 | −0.6 | 1.10 | 090 | 1.04 |
| Ink 2 | Impranil ® DLN-SD | A8160 | Gildan Black 780 | 76.2 | 71.9 | −4.3 | 4.38 | 3.32 | 2.00 |
| Ink 2 | D4 | A8160 | Pakistan #10 | 85.4 | 86.0 | 0.6 | 1.11 | 0.93 | 1.16 |
| Ink 2 | D4 | A8160 | Pakistan #10 | 86.2 | 86.1 | −0.1 | 1.01 | 0.92 | 1.21 |
| Ink 2 | D4 | A8160 | Pakistan #10 | 86.5 | 85.5 | −1.0 | 1.62 | 1.28 | 1.59 |
| Ink 2 | D2 | A8160 | Pakistan #10 | 86.4 | 86.1 | −0.4 | 1.14 | 0.99 | 1.34 |
| Ink 2 | Impranil ® DLN-SD | A8160 | Pakistan #10 | 84.2 | 803 | −3.9 | 4.35 | 3.13 | 2.63 |

TABLE 3B-continued

Durability of White Ink Compositions
Printed and Heat-Cured on Black 100 wt % Cotton Fabrics

| Ink ID | PU Disp. ID | Pen ID | Fabric ID | Initial L* | L* 5 wash | % ΔL | ΔE$_{CIE}$ | ΔE$_{2000}$ | ΔE$_{CMC}$ (2:1) |
|---|---|---|---|---|---|---|---|---|---|
| | | | | | | | 150° C. Curing | | |
| Ink 2 | D4 | A12000 | Gildan Black 780 | 79.8 | 78.5 | −1.3 | 1.46 | 1.09 | 0.89 |
| Ink 2 | D4 | A12000 | Gildan Black 780 | 77.0 | 76.1 | −0.9 | 1.25 | 0.99 | 0.98 |
| Ink 2 | D4 | A12000 | Gildan Black 780 | 79.6 | 78.4 | −1.1 | 1.27 | 0.97 | 0.80 |
| Ink 2 | D2 | A12000 | Gildan Black 780 | 78.9 | 78.1 | −0.9 | 1.16 | 0.93 | 0.92 |
| Ink 2 | Impranil ® DLN-SD | A12000 | Gildan Black 780 | 73.6 | 70.8 | −2.8 | 2.93 | 2.31 | 1.55 |
| Ink 2 | Impranil ® DLN-SD | A12000 | Gildan Black 780 | 70.7 | 67.9 | −2.9 | 3.17 | 2.59 | 1.90 |
| Ink 2 | D4 | A12000 | Pakistan #10 | 86.2 | 85.3 | −0.9 | 1.41 | 1.12 | 1.36 |
| Ink 2 | D4 | A12000 | Pakistan #10 | 85.5 | 84.2 | −1.3 | 1.69 | 1.29 | 1.42 |
| Ink 2 | D4 | A12000 | Pakistan #10 | 87.6 | 85.6 | −2.0 | 2.56 | 1.94 | 2.25 |
| Ink 2 | D2 | A12000 | Pakistan #10 | 86.9 | 85.4 | −1.5 | 2.29 | 1.81 | 2.27 |
| Ink 2 | Impranil ® DLN-SD | A12000 | Pakistan #10 | 79.8 | 77.2 | −2.5 | 2.90 | 2.20 | 1.88 |
| Ink 2 | Impranil ® DLN-SD | A12000 | Pakistan #10 | 80.0 | 77.4 | −2.6 | 2.89 | 2.20 | 1.83 |

D4 was tested three times using three different polyurethane batches from two different inkjet pens on both black cotton fabrics.
Impranil ® DLN-SD was tested twice from A12000 on Pakistan #10 black cotton fabric.
Impranil ® DLN-SD is available from Covestro (Germany).

As can be seen from the data collected above, the white ink compositions prepared in accordance with the present disclosure, using the polyurethanes prepared as described herein and labeled D1-D6, and more specifically, D1, D2, and D4 where data was collected, had better opacity and wash durability than white ink compositions prepared with commercial material Impranil® DLN-SD.

Example 10—White Ink Compositions with Polyurethane Particles and Accelerated Shelf Life (ASL) and Temperature Cycling (T-Cycle) Stability ASL and T-cycle data was collected for samples of the white ink compositions containing the polyurethane particles prepared in accordance with the present disclosure, namely polyurethane dispersion samples D1, D2, and D4. ASL and T-cycle data was also collected similarly for Impranil® DLN-SN, as shown in Table 4A-4D below. The white ink compositions had initial viscosities ranging from about 2 centipoise (cP) to about 4 cP. The ASL data was collected for the white ink composition before and after 1 week of storage at 60° C. The T-cycle (T-cycle) data relates to data collected after temperature cycling using multiple freeze-thaw cycles at from −40° C. to 70° C. D50 data refers to Volume Averaged (Mv) Particle Size in nanometers (nm) and was collected using a NanoTrac® 150 particle size system. D95 data refers to the 95$^{th}$ Percentile Particle Size. Viscosity (v) refers to the fluid viscosity of the white ink composition. pH data was also collected for some samples. The use of "delta" or "Δ" data relates to a comparison prior to and after ASL or T-cycle challenge. This can be expressed based on a % Δ (as used in Tables 4A, 4B, and 4D), or can be used to show a measured value change (as is the case with pH in Table 4C).

TABLE 4A

Intial and T-Cycle Particle Sizes (nm) at D50 and D95

| Ink ID | PU Disp. ID | D50 Initial | D95 Initial | D50 T-cycle | D95 T-cycle | % Δ D50 T-cycle | % Δ D95 T-cycle |
|---|---|---|---|---|---|---|---|
| Ink 1 | D1 | 0.321 | 0.646 | 0.358 | 0373 | 11.5 | −42.3 |
| Ink 1 | D2 | 0.316 | .0455 | 0.355 | 0.373 | 12.3 | −18.0 |
| Ink 1 | D4 | 0.320 | 0.495 | 0.370 | 0.363 | 15.6 | −26.7 |
| Ink 1 | Impranil ® DLN-SD | 0.321 | 0.478 | 0.304 | 0.340 | −5.3 | −28.9 |
| Ink 2 | D4 | 0.322 | 0.463 | 0.316 | 0.460 | 1.2 | −0.6 |
| Ink 2 | D4 | 0.332 | 0.549 | 0.355 | 0.529 | 6.9 | −3.6 |
| Ink 2 | D4 | 0.334 | 0.505 | 0.359 | 0.575 | 7.5 | 13.9 |

TABLE 4A-continued

Intial and T-Cycle Particle Sizes (nm) at D50 and D95

| Ink ID | PU Disp. ID | D50 Initial | D95 Initial | D50 T-cycle | D95 T-cycle | % Δ D50 T-cycle | % Δ D95 T-cycle |
|---|---|---|---|---|---|---|---|
| Ink 2 | D2 | 0.320 | 0.501 | 0.361 | 0.537 | 12.8 | 7.2 |
| Ink 2 | Impranil ® DLN-SD | 0.351 | 0.544 | 0.359 | 0568 | 2.3 | 4.4 |

Impranil ® DLN-SD is available from Covestro (Germany).

TABLE 4B

Intial and ASL Particle Sizes (nm) at D50 and D95

| Ink ID | PU Disp. ID | D50 Initial | D95 Initial | D50 ASL | D95 ASL | % Δ D50 ASL | % Δ D95 ASL |
|---|---|---|---|---|---|---|---|
| Ink 1 | D1 | 0.321 | 0.646 | 0.311 | 0.472 | −3.1 | −26.9 |
| Ink 1 | D2 | 0.316 | .0455 | 0.319 | 0.456 | 0.9 | 0.2 |
| Ink 1 | D4 | 0.320 | 0.495 | 0.318 | 0.485 | −0.6 | −2.0 |
| Ink 1 | Impranil ® DLN-SD | 0.321 | 0.478 | 0.323 | 0.531 | 0.6 | 11.1 |
| Ink 2 | D4 | 0.322 | 0.463 | 0.338 | 0.480 | 5.0 | 3.7 |
| Ink 2 | D4 | 0.332 | 0.549 | 0.323 | 0.514 | −2.7 | −6.4 |
| Ink 2 | D4 | 0.334 | 0.505 | 0.345 | 0.493 | 3.3 | −2.4 |
| Ink 2 | D2 | 0.320 | 0.501 | 0.316 | 0.455 | −1.3 | −9.2 |
| Ink 2 | Impranil ® DLN-SD | 0.351 | 0.544 | 0.328 | 0.508 | −6.6 | −6.6 |

Impranil ® DLN-SD is available from Covestro (Germany).

TABLE 4C

Intial, T-cycle, and ASL pH Data

| Ink ID | PU Disp. ID | Initial | T-cycle | Δ pH T-cycle | ASL | Δ pH ASL |
|---|---|---|---|---|---|---|
| Ink 2 | D4 | 8.25 | 7.47 | −0.78 | 7.24 | −1.01 |
| Ink 2 | D4 | 8.19 | 7.44 | −0.75 | 7.19 | −1.00 |
| Ink 2 | D4 | 8.27 | 7.42 | −0.85 | 7.20 | −1.07 |
| Ink 2 | D2 | 8.29 | 7.37 | −0.92 | 7.07 | −1.22 |
| Ink 2 | Impranil ® DLN-SD | 8.28 | 7.31 | −0.97 | 6.89 | −1.39 |

Impranil ® DLN-SD is available from Covestro (Germany).

TABLE 4D

Intial, T-cycle, and ASL Viscosity (cP) Data

| Ink ID | PU Disp. ID | Initial | T-cycle | % Δ cP T-cycle | ASL | % Δ cP ASL |
|---|---|---|---|---|---|---|
| Ink 2 | D4 | 3.0 | 3.4 | 13.3 | 3.1 | 3.3 |
| Ink 2 | D4 | 3.0 | 3.3 | 10.0 | 2.9 | −3.3 |
| Ink 2 | D4 | 3.0 | 3.5 | 16.7 | 3.0 | 0.0 |
| Ink 2 | D2 | 2.9 | 3.3 | 13.8 | 3.1 | 6.9 |
| Ink 2 | Impranil ® DLN-SD | 3.4 | 3.4 | 0.0 | 2.9 | −14.7 |

Impranil ® DLN-SD is available from Covestro (Germany).

As can be seen from the data collected above, the white ink compositions prepared in accordance with the present disclosure, using the polyurethanes prepared as described herein and labeled D1-D6, and more specifically, D1, D2, and D4 where data was collected, exhibited both good ASL and T-cycle stability in terms of particle size at D50 and D95 (Tables 4A and 4B), and viscosity (Table 4D). As shown in Table 4C, the pH tends to drop around 0.9 to 1.4 after T-cycle and ASL challenge.

Example 11—White Ink Composition Decap Performance

For various white ink compositions prepared in accordance with the present disclosure, as well as for a comparative example using Impranil® DLN-SD, decap performance was evaluated. Specifically, polyurethane dispersions D1, D2, D4, and Impranil® DLN-SD were evaluated using Ink 1, and polyurethane dispersions D2, D4, and Impranil® DLN-SD were evaluated using Ink 2. "Decap" was determined using the indicated times in Tables 5A and 5B below at which the nozzles remained open (uncapped). The numerical values provided at the given "uncapped" times is based on the number of spits (or lines) before a line could be printed. Thus, the lower the number, the better for decap performance, as there would be fewer spits before the full lines started printing correctly. For this decap evaluation, the firing conditions were as follows: Precursor Pulse/Dead-Time/Firing Pulse (P/D/F) at 0.25 μs/0.6 μs/0.6 μs; Temperature at 45° C.; Over Energy (OE) at 20%; 36 kHz—1000 pumps; and Power Supply Voltage (Vpp) Logic Gap at 0.7 V.

TABLE 5

Decap Performance (Ink 1 and Pen A8160)

| | | | Decap (second) | | | |
|---|---|---|---|---|---|---|
| Ink ID | PU Disp. ID | Pen ID | 0.07 | 0.33 | 1.11 | 1.9 |
| Ink 1 | D1 | A8160 | 3 | 2 | 3 | 10 |
| Ink 1 | D2 | A8160 | 3 | 2 | 5 | 14 |
| Ink 1 | D4 | A8160 | 3 | 2 | 4 | 10 |
| Ink 1 | Impranil ® DLN-SD | A8160 | 3 | 3 | 6 | Fail |

TABLE 5B

Decap Performance (Ink 2)

| Ink ID | PU Disp. ID | Pen ID | Decap (second) | | | | | |
|---|---|---|---|---|---|---|---|---|
| | | | 0.09 s | 1.08 s | 3.08 s | 5.07 s | 7.06 s | 9.05 s |
| Ink 2 | D4 | A8160 | *No Data Collected | | | | | |
| Ink 2 | D4 | A8160 | 1 | 1 | 1 | 1 | 1 | 1 |
| Ink 2 | D4 | A8160 | 1 | 1 | 1 | 1 | 1 | 1 |
| Ink 2 | D2 | A8160 | 1 | 1 | 1 | 1 | 1 | |
| Ink 2 | Impranil® DLN-SD | A8160 | 1 | 1 | 1 | 2 | 4 | 8 |
| Ink 2 | D4 | A12000 | 1 | 1 | 1 | 1 | 2 | 4 |
| Ink 2 | D4 | A12000 | 1 | 1 | 1 | 1 | 1 | 4 |
| Ink 2 | D4 | A12000 | 1 | 1 | 1 | 1 | 1 | 2 |
| Ink 2 | D2 | A12000 | 1 | 1 | 1 | 1 | 1 | 3 |
| Ink 2 | Impranil® DLN-SD | A12000 | 1 | 1 | 5 | 9 | 12 | 14 |

*Note
only two runs of D4 are shown, as the first run failed due to pen drooling (pen failure) for a reason unrelated to the ink composition formulation.

As can be seen by Tables 5A and 5B, the white ink compositions based on polyurethane D1, D2, and D4 (Table 5A) and D2 and D4 (Table 5B) had better performance than similarly formulated white ink compositions prepared using the commercial polyurethane Impranil® DLN-SD. In Table 5B, the A8160 pen exhibited better decap performance than the A12000 pen, but both showed the same trend of better decap performance using the polyurethanes of the present disclosure.

Example 12—Other White Ink Composition Printability Performance Data

A few of the white ink compositions that included the polyurethane particles identified in Table 1A and D2 and D4 were evaluated for additional print performance parameters from a thermal inkjet pen (A3410, available from HP, Inc.), and again compared against a similar ink formulated using Impranil® DLN-SD.

The data was collected according to the following procedures:

Percent (%) Missing Nozzles is calculated based on the number of nozzles incapable of firing at the beginning of a jetting sequence as a percentage of the total number of nozzles on an inkjet printhead attempting to fire. Thus, the lower the percentage number, the better the Percent Missing Nozzles value.

Drop Weight (DW) is an average drop weight in nanograms (ng) across the number of nozzles fired measured using a burst mode or firing.

Drop Weight 2,000 (DW 2K) is measured using a 2-drop mode of firing, firing 2,000 drops and then measuring/calculating the average white ink composition drop weight in nanograms (ng).

Drop Volume (DV) refers to an average velocity of the drop as initially fired from the thermal inkjet nozzles.

Turn On Energy (TOE) Curve refers to the energy used to generate consistent white ink composition firing at a drop weight (DW) threshold. Lower energy to achieve higher drop weights tends to be desirable, with DW increasing with increased energy and then flattening out as still more energy is applied.

Decel refers to the loss in drop velocity after 5 seconds of white ink composition firing.

For this evaluation, the firing conditions were as follows: Precursor Pulse/DeadTime/Firing Pulse (P/D/F) at 0.25 µs/0.6 µs/0.6 µs; Temperature at 45° C.; Over Energy (OE) at 20%; 36 kHz—1000 pumps; and Power Supply Voltage (Vpp) Logic Gap at 0.7 V.

The data collected is provide in Table 6, as follows:

TABLE 6

Thermal Inkjet Print Performance

| Ink ID | PU Disp. ID | Pen ID | % Missing Nozzles | DW Drop # KHz | DW 2K Drop 30 KHz | DV (m/s) | TOE Curve | Decel (m/s) |
|---|---|---|---|---|---|---|---|---|
| Ink 2 | D4 | A8160 | *No Data Collected | | | | | |
| Ink 2 | D4 | A8160 | 0 | 10.1 | 9.9 | 11.9 | Good, TOE 0.82 | 2 DV Decay |
| Ink 2 | D4 | A8160 | 0 | 10.6 | 9.0 | 12.0 | Good, TOE 0.82 | 1 DV Decay |
| Ink 2 | D2 | A8160 | 0 | 11.1 | 10.0 | 10.8 | Good, TOE 0.82 | 0.6 DV Decay |
| Ink 2 | Impranil® DLN-SD | A8160 | 6 | 9.3 | 7.4 | 8.3 | Very Soft, TOE 0.88 | Noisy |
| Ink 2 | D4 | A12000 | 26 | 9.5 | 10.7 | 10.4 | Slightly Soft, TOE 0.82 | 1 DV Decay |

TABLE 6-continued

Thermal Inkjet Print Performance

| Ink ID | PU Disp. ID | Pen ID | % Missing Nozzles | DW Drop # KHz | DW 2K Drop 30 KHz | DV (m/s) | TOE Curve | Decel (m/s) |
|---|---|---|---|---|---|---|---|---|
| Ink 2 | D4 | A12000 | 1 | 9.7 | 10.9 | 10.5 | Slightly Soft, TOE 0.82 | 1.7 DV Decay |
| Ink 2 | D4 | A12000 | 23 | 9.9 | 11.5 | 10.4 | Good, TOE 0.82 | 1 DV Decay |
| Ink 2 | D2 | A12000 | 20 | 9.3 | 10.5 | 10.1 | Slightly Soft, TOE 0.84 | 0.6 DV Decay |
| Ink 2 | Impranil ® DLN-SD | A12000 | 16 | 7.3 | 5.6 | 6.4 | Soft, TOE 0.94 | Noisy |

*Note
only two runs of D4 are shown, as the first run failed due to pen drooling (pen failure) for a reason unrelated to the ink composition formulation.
Impranil ® DLN-SD is available from Covestro (Germany).

As can be seen in Table 6, the white ink compositions prepared in accordance with the present disclosure had better overall printability performance, with better ink refill, drop velocity, and TOE curve compared to white ink compositions prepared with Impranil® DLN-SD. Thermal Inkjet Pen A8160 showed a higher steady state drop weight, drop volume, and TOE curve than A12000, but A12000 showed better ink refill.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A white ink composition, comprising:
   a liquid vehicle including water and an organic co-solvent;
   from 0.5 wt % to 15 wt % of white metal oxide particles dispersed in the liquid vehicle; and
   from 0.1 wt % to 30 wt % of polyurethane particles dispersed in the liquid vehicle, wherein the polyurethane particles include a polyurethane polymer having a polymer backbone, and wherein the polyurethane polymer includes polymerized sulfonated-diamines each having an amine portion present in the polymer backbone, polymerized nonionic diamines present in the polymer backbone, and isocyanate-generated self-crosslinked amines each having its nitrogen atom present in the polymer backbone.

2. The white ink composition of claim 1, wherein the polyurethane polymer includes from 15 wt % to 25 wt % of polymerized diisocyanates, wherein the polymerized diisocyanates include polymerized isophorone diisocyanate, polymerized 2,2,4-trimethylhexane-1,6-diisocyanate, polymerized 2,4,4-trimethylhexane-1,6-diisocyanate, or a mixture thereof.

3. The white ink composition of claim 1, wherein the polymerized nonionic diamines include a saturated C2 to C16 alkyl diamine, a C6 to C18 saturated alicyclic diamine, or a C8 to C20 alicyclic-alkyl diamine.

4. The white ink composition of claim 1, wherein the amine portion of the polymerized sulfonated-diamines includes multiple amine groups polymerized along the polymer backbone, and wherein the polymerized sulfonated-diamines include a sulfonate group appended to the polymer backbone as part of a side chain therefrom.

5. The white ink composition of claim 1, wherein the isocyanate-generated self-crosslinked amines are present in the polyurethane particles in an amount of from 1 wt % to 10 wt %.

6. The white ink composition of claim 1, wherein the polyurethane particles have a D50 particle size of from 20 nm to 400 nm.

7. The white ink composition of claim 1, wherein the polyurethane particles have an acid number of from 0 mg KOH/g to 30 mg KOH/g.

8. The white ink composition of claim 1, wherein the polyurethane particles have a D50 particle size of from 125 nm to 250 nm and an acid number of from 1 mg KOH/g to 15 mg KOH/g.

9. The white ink composition of claim 1, wherein the polyurethane particles include polyester polyurethane moieties.

10. A textile printing system, comprising:
    a fabric substrate;
    a white ink composition, comprising:
       a liquid vehicle including water and an organic co-solvent;
       from 0.5 wt % to 15 wt % of white metal oxide particles dispersed in the liquid vehicle; and
       from 0.1 wt % to 30 wt % of polyurethane particles dispersed in the liquid vehicle, wherein the polyurethane particles include a polyurethane polymer having a polymer backbone, and wherein the polyurethane polymer includes with polymerized sulfonated-diamines each having an amine portion present in the polymer backbone, polymerized nonionic diamines present in the polymer backbone, and isocyanate-generated self-crosslinked amines each having its nitrogen atom present the polymer backbone.

11. The system of claim 10, further comprising a heat curing device to heat the fabric substrate after the white ink composition is printed thereon to a temperature from 70° C. to 250° C. for a period of 15 seconds to 10 minutes.

12. The system of claim 10, wherein the fabric substrate is a dark fabric substrate having an L* value from 15 to 50.

13. A method of textile printing, comprising:
    jetting a white ink composition onto a fabric substrate, wherein the white ink composition includes:
       a liquid vehicle including water and an organic co-solvent;

from 0.5 wt % to 15 wt % of white metal oxide particles dispersed in the liquid vehicle; and from 0.1 wt % to 30 wt % of polyurethane particles dispersed in the liquid vehicle, wherein the polyurethane particles include a polyurethane polymer having a polymer backbone, and wherein the polyurethane polymer includes polymerized sulfonated-diamines each having an amine portion present in the polymer backbone, polymerized nonionic diamines present in the polymer backbone, and isocyanate-generated self-crosslinked amines each having its nitrogen atom present in the polymer backbone; and heating the fabric substrate having the white ink composition printed thereon to a temperature from 70° C. to 250° C. for a period of 15 seconds to 10 minutes to self-crosslink the polyurethane particles.

14. The method of claim 13, wherein:

the amine portion of the polymerized sulfonated-diamines includes multiple amine groups polymerized along the polymer backbone, and wherein the polymerized sulfonated-diamines include a sulfonate group appended to the polymer backbone as part of a side chain therefrom;

the polymerized nonionic diamines include a saturated C2 to C16 alkyl diamine, a C6 to C18 saturated alicyclic diamine, or a C8 to C20 alicyclic-alkyl diamine; or both.

15. The method of claim 13, wherein the polyurethane particles have a D50 particle size of from 20 nm to 400 nm, an acid number of from 0 mg KOH/g to 30 mg KOH/g, or both.

* * * * *